(12) United States Patent
Sunden

(10) Patent No.: US 7,117,383 B2
(45) Date of Patent: Oct. 3, 2006

(54) PHASE DIFFERENCE DELAY CONTROL SYSTEM FOR ACCOMMODATING FLUCTUATION IN PHASE DIFFERENCE IN DISTANCE MEASURING SYSTEM

(75) Inventor: Hironobu Sunden, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 453 days.

(21) Appl. No.: 10/263,074

(22) Filed: Oct. 2, 2002

(65) Prior Publication Data

US 2003/0158686 A1 Aug. 21, 2003

(30) Foreign Application Priority Data

Feb. 19, 2002 (JP) ............................. 2002-042208

(51) Int. Cl.
*G06F 1/04* (2006.01)
(52) U.S. Cl. ...................... 713/500; 713/500; 713/503; 702/195
(58) Field of Classification Search ................ 702/195; 713/500, 503
See application file for complete search history.

(56) References Cited

U.S. PATENT DOCUMENTS

| | | | |
|---|---|---|---|
| 4,827,474 A | | 5/1989 | Le Goffic et al. |
| 4,949,090 A | * | 8/1990 | Tamii et al. ................. 342/173 |
| 5,524,029 A | | 6/1996 | Takenaka et al. |
| 5,920,800 A | * | 7/1999 | Schafer ...................... 725/121 |

FOREIGN PATENT DOCUMENTS

| | | |
|---|---|---|
| EP | 0 955 742 | 11/1999 |
| JP | 63-306729 | 12/1988 |
| WO | WO 01/22620 | 3/2001 |

OTHER PUBLICATIONS

European Search Report dated Nov. 30, 2005.

* cited by examiner

*Primary Examiner*—Thuan N. Du
*Assistant Examiner*—Tse Chen
(74) *Attorney, Agent, or Firm*—Katten Muchin Rosenman LLP

(57) ABSTRACT

A phase difference delay control system is provided that enables distance measurement between a reference position and a terminal at the time of recovery after a line has been disconnected as a result of fluctuation of phase difference of clock crossover units. In a system for measuring the distance between a reference position and the terminal, first and second interface units comprise respective clock crossover units for sending to a transmission line a signal to which an overhead including phase information for matching the phase of a redundant signal is added, or for sending to the terminal or the reference position the signal from the transmission line, wherein one of the clock crossover units that operate according to the reference clock signal is notified of a fluctuation amount of the phase difference between write and read operation in the other of the clock crossover units and, upon initialization of the phase difference, an initial phase difference is adjusted taking the fluctuation amount into account.

5 Claims, 21 Drawing Sheets

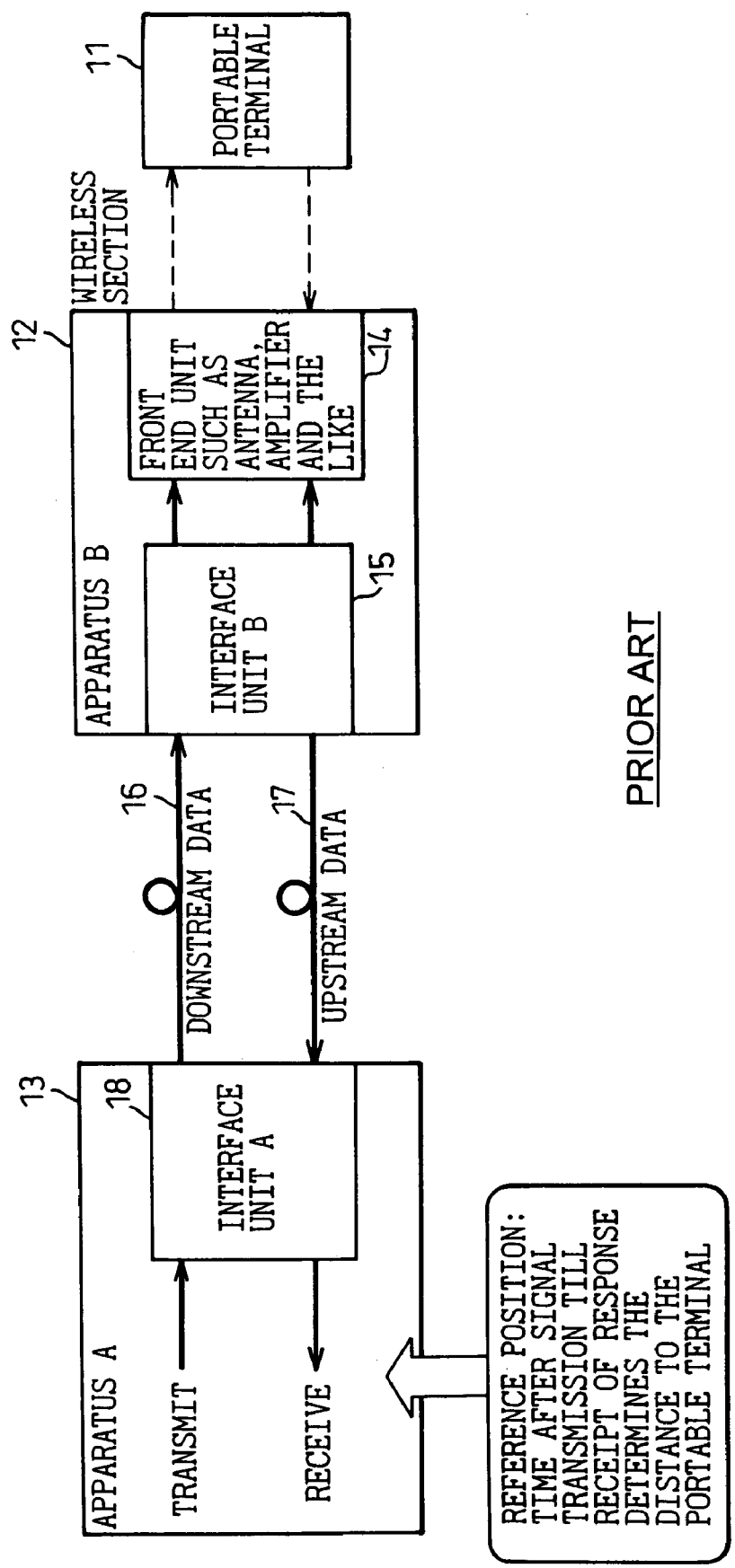

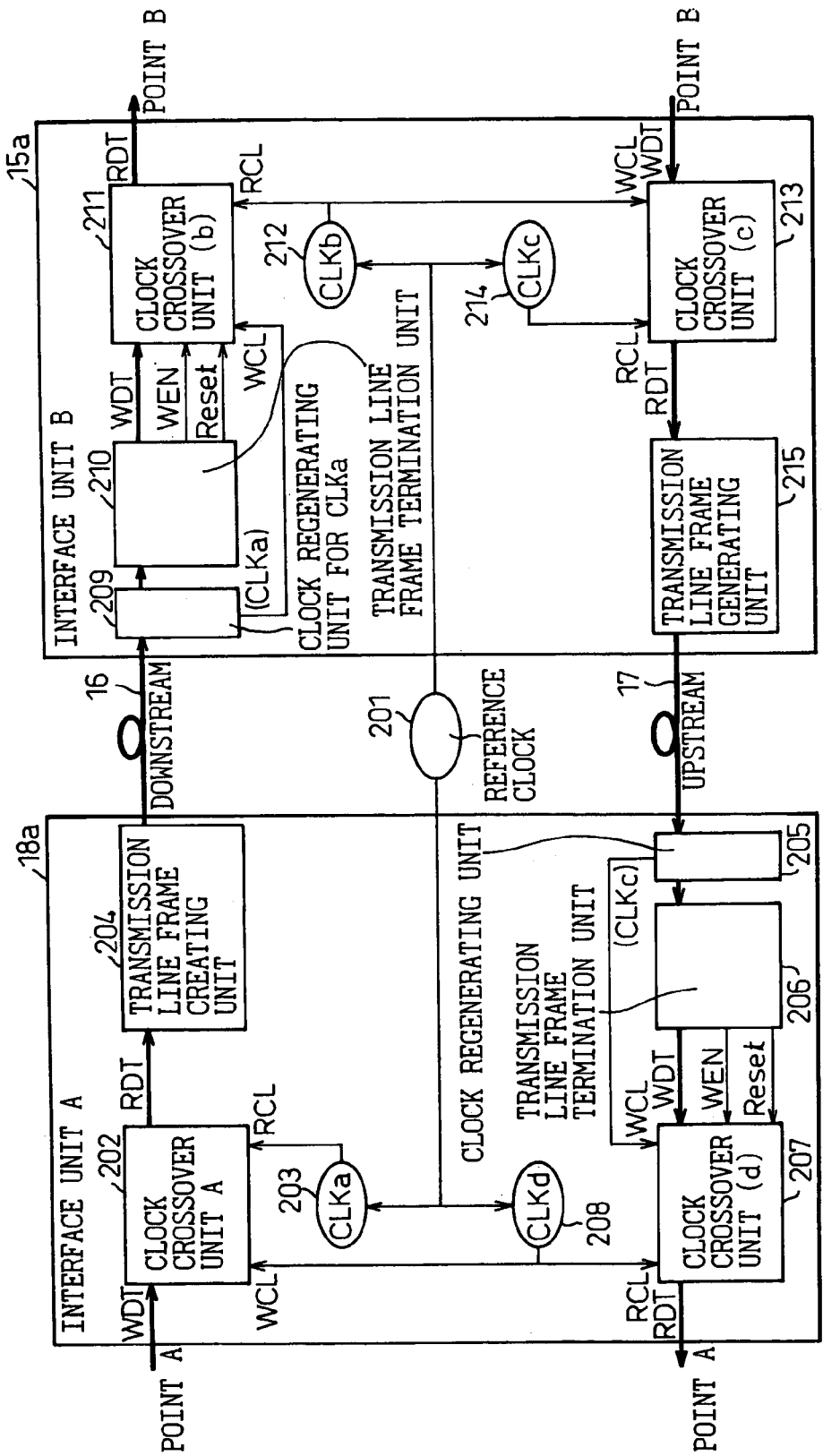

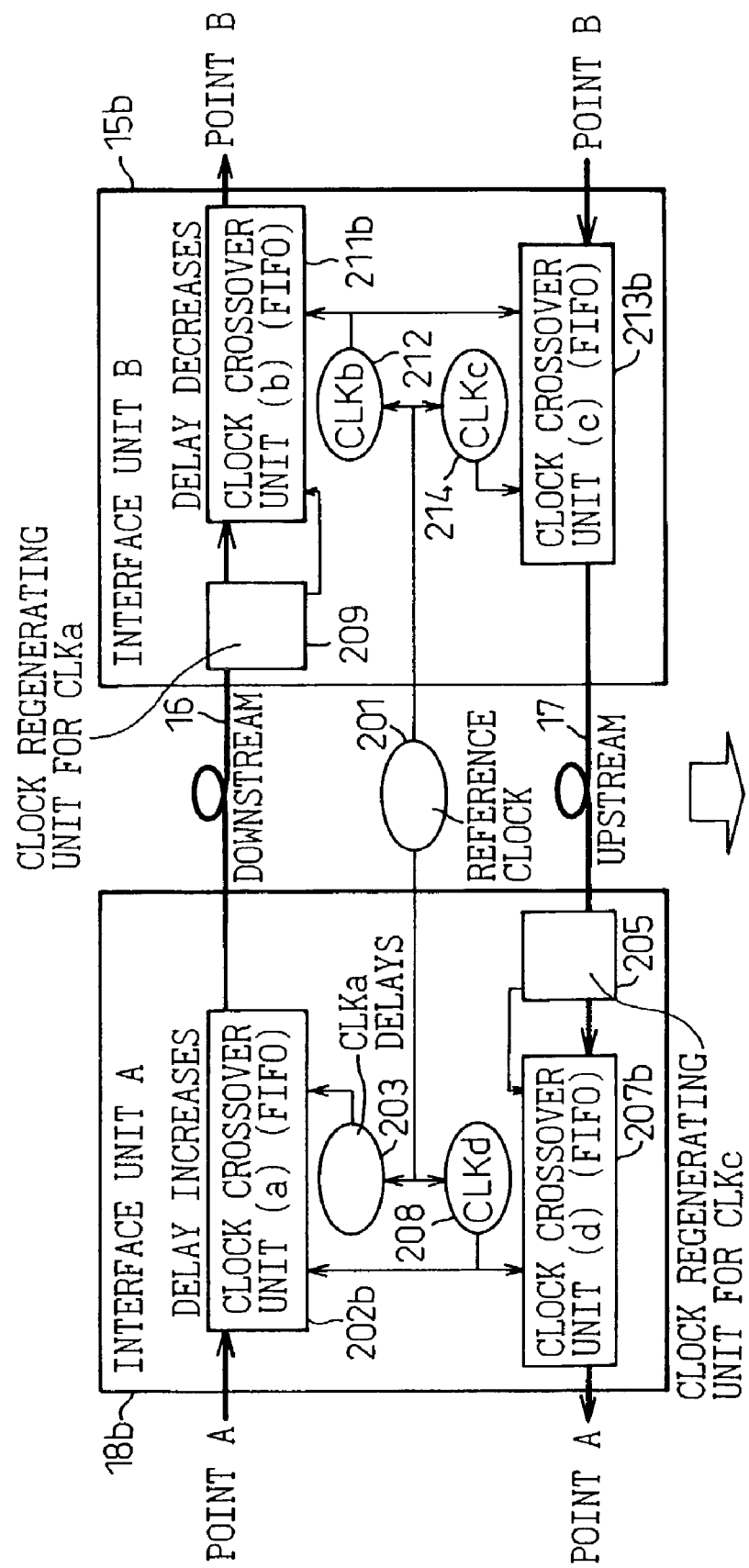

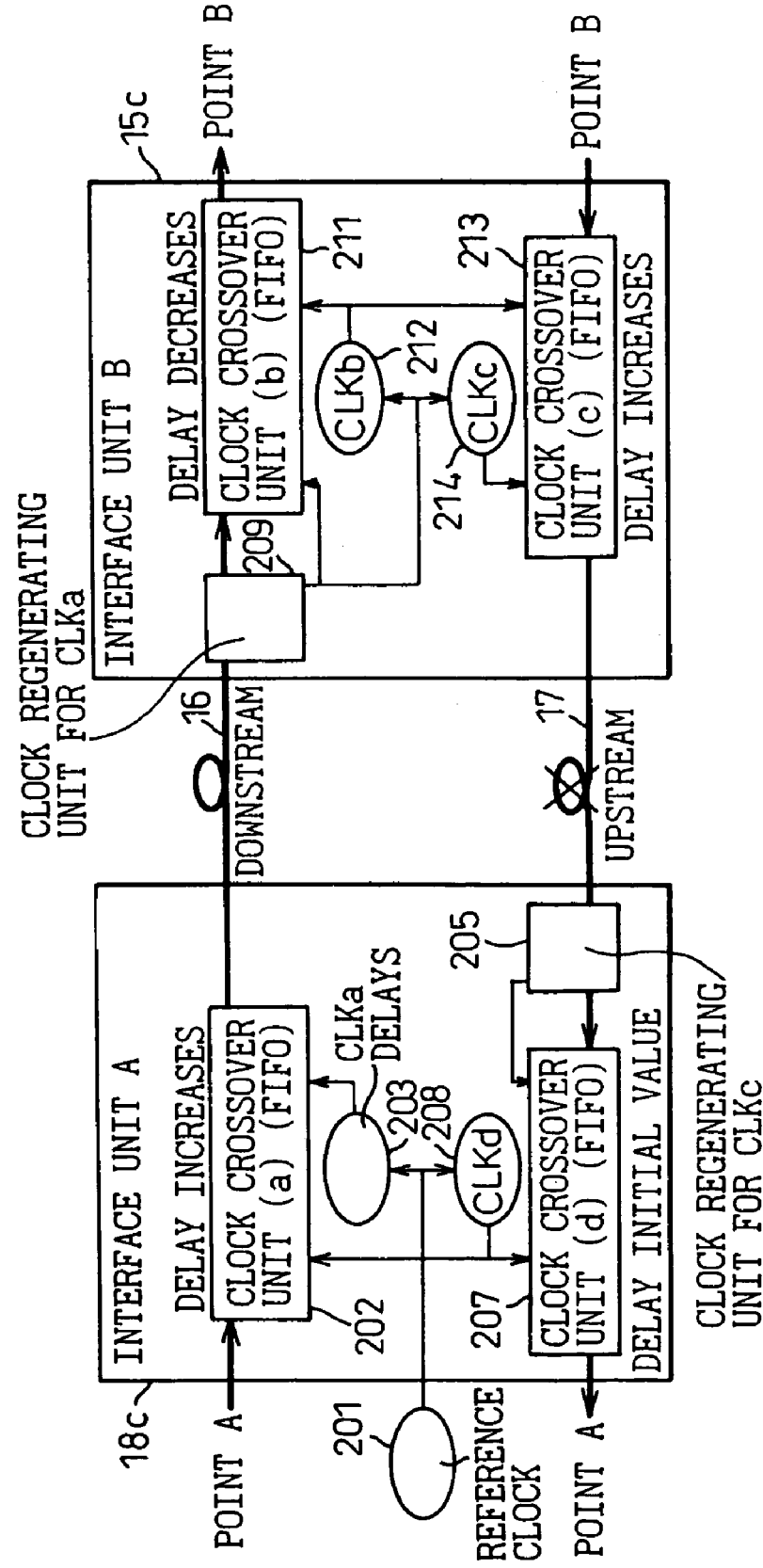

PHASE DIFFERENCE DELAY CONTROL SYSTEM FOR ACCOMMODATING FLUCTUATION IN PHASE DIFFERENCE IN DISTANCE MEASURING SYSTEM

BACKGROUND OF THE INVENTION

1. Field of the Invention

The present invention relates to a phase difference delay control system in a distance measuring system in WCDMA (Wideband Code Division Multiple Access) and other cellular phone communication systems and the like. In particular, it relates to a phase difference delay control system that has a transmission line between a reference position and a terminal and that accommodates fluctuation of phase difference occurring in clock crossover units when the distance between the reference position and the terminal including the transmission line is measured.

2. Description of the Related Art

Conventionally, the distance between a reference position and a terminal has been measured at the reference position for the distance measurement by recognizing the distance based upon a difference between the time when a signal is transmitted from the reference position to the terminal and the time when a signal from the terminal in response to the transmitted signal is received at the reference position.

However, when a section of the transmission line between the reference position and the terminal is made longer by using fiber-optic cables, a plurality of transmission channels may be used to transmit the signal and an optimal transmission channel may be selected when the signal is received. In this case, clock crossover units may be needed at both the transmitting and receiving parties in order to match phases of the received signal through the plurality of transmission channels at the receiving party, to create a transmission frame, and to add additional information such as an overhead and the like.

Conventionally, a system that comprises such clock crossover units and measures a distance by transmitting and receiving a signal did not exist.

SUMMARY OF THE INVENTION

Problem to be Resolved by the Invention

When a system that comprises clock crossover units and measures a distance by transmitting and receiving a signal is configured, there may be a problem in that the amount of delay may increase upon initialization of the clock crossover units when the system recovers after the transmission line has been disconnected as a result of fluctuation of phase difference between a read phase and a write phase in the clock crossover units, as will be described in detail later.

It is an object of the present invention to provide a phase difference delay control system that enables distance measurement by keeping the signal processing time as a whole between a reference position and a terminal constant even when the system is recovered after a transmission line has been disconnected as a result of fluctuation of phase difference between a read phase and a write phase in clock crossover units in a distance measurement system between the reference position and the terminal in a transmission line section that comprises the clock crossover units between the reference position and the terminal.

Means to Solve the Problems

In order to solve the above problem, according to an aspect of the present invention, there is provided a phase difference delay control system wherein one of the clock crossover units that operate according to the reference clock signal is notified of a fluctuation amount of a phase difference between a write clock signal and a read clock signal and, upon initialization of a phase difference between the write clock signal and the read clock signal of the one of the clock crossover units, a predetermined value of the phase difference is adjusted taking the amount of fluctuation into account.

By employing the above system, it becomes possible to precisely measure the distance between the reference position and the terminal, since any fluctuation of phase difference between the read phase and the write phase in the clock crossover units is canceled out by the initialization of the phase difference.

The above and other objects and features of the present invention will be more apparent from embodiments of the present invention with reference to the appended drawings.

BRIEF DESCRIPTION OF THE DRAWINGS

FIG. 1 is a block diagram showing a schematic configuration of a distance measuring system to which the present invention is applied;

FIG. 2 is a block diagram showing a configuration of interface units for network synchronization conceivable before development of the present invention;

FIGS. 5A and 5B are block diagrams showing a configuration of interface units in a distance measuring system for a network synchronization method according to a first embodiment of the present invention;

FIGS. 13A and 13B are block diagrams describing operation upon initialization after clock fluctuation in the configuration of FIG. 12;

DESCRIPTION OF THE PREFERRED EMBODIMENTS

Figure 3A:
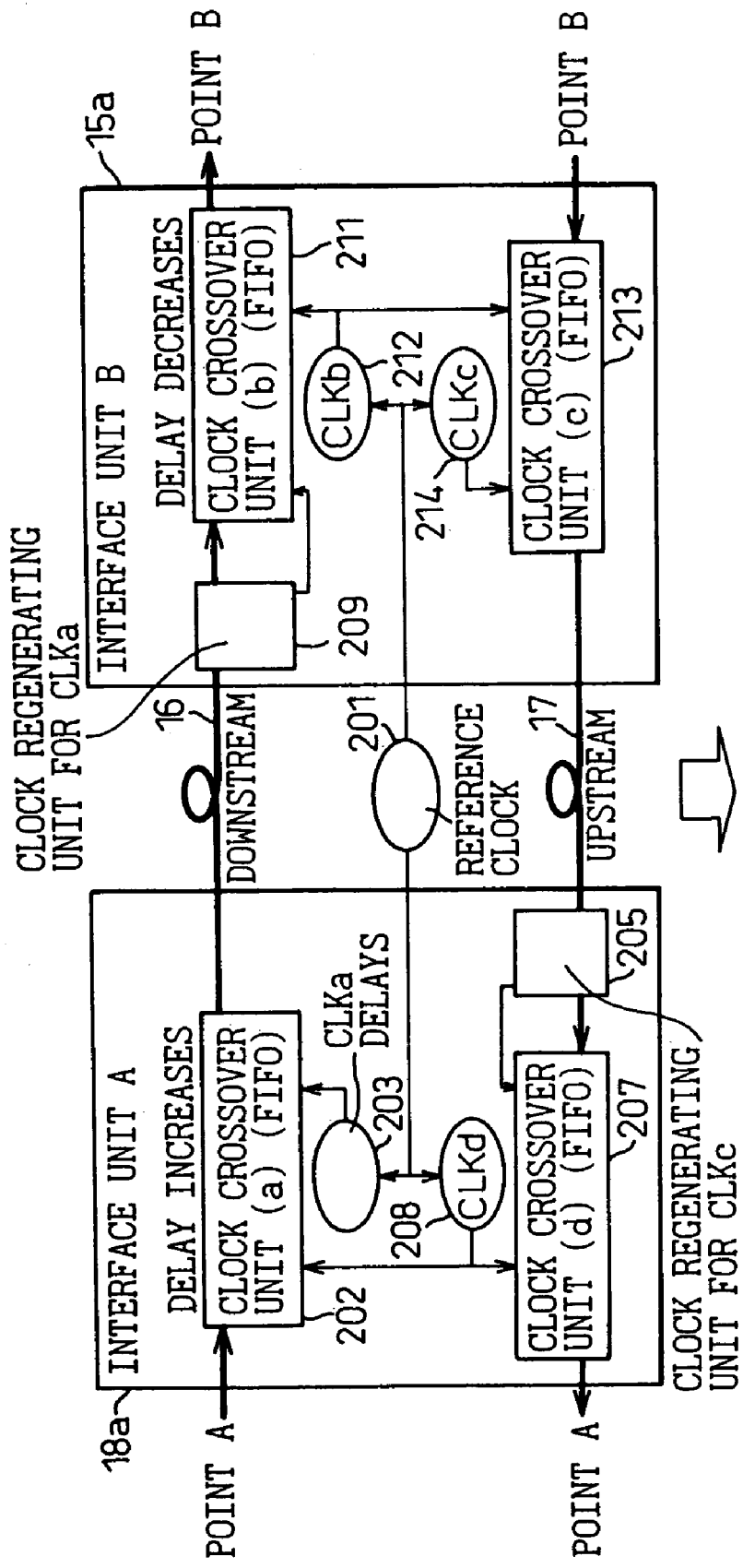
FIGS. 3A and 3B are block diagrams describing operation upon initialization after fluctuation of a clock signal in the configuration of FIG. 2.

Hereinafter, embodiments of the present invention will be described in detail with reference to the drawings. Throughout the views, like reference numerals indicate like elements, and the like reference numerals to which an alphabetical letter such as (a), (b), (c), and so on is attached indicate corresponding elements in different embodiments.

FIG. 1 is a block diagram showing a schematic configuration of a distance measuring system to which the present invention is applied.

As shown in FIG. 1, the distance measuring system comprises a portable terminal 11, and an apparatus B 12 and an apparatus A 13. The area between the portable terminal 11 and the apparatus B 12 is a wireless section. The apparatus B comprises a front end unit 14 including an antenna, an amplifier and the like and an interface unit B 15. The apparatus A comprises an interface unit A 18. The area between the interface unit A 18 and the interface unit B 15 is an optical transmission section. The optical transmission section consists of a downstream (a downlink transmission line) 16 and an opposite upstream (an uplink transmission line) 17.

To define the position of the apparatus A 13 as a reference position, the distance between the reference position and the portable terminal can be determined by measuring the time after the data is transmitted from the apparatus A 13 to the portable terminal 11 till a response to the data from the portable terminal is received by the apparatus A 13.

Though not apparent in FIG. 1, the upstream line 17 has a redundant configuration in which identical data is transmitted through a plurality of transmission lines simultaneously. To receive optimal data, the receiving party selects an optimal transmission line among the plurality of the transmission lines.

There are two types of synchronization systems: a network synchronization system in which a read operation of the clock crossover unit at the receiving party is performed according to a reference clock signal, and a slave synchronization system in which the read operation is performed according to a regenerated clock signal.

First, the network synchronization system will be described.

FIG. 2 is a block diagram showing a configuration of interface units for network synchronization conceivable before development of the present invention.

As shown in FIG. 2, a reference clock signal generator 201 is connected between an interface unit A 18a and an interface unit B 15a which generates a reference clock signal for network synchronization. The interface unit A 18a comprises a clock crossover unit (a) 202, a first clock signal generator 203 that operates according to the reference clock signal, a frame creating unit 204 that creates a frame that is output to the downstream line 16, a clock regenerating unit 205 that regenerates a clock from the data received from the upstream line 17, a transmission line frame termination unit 206 that extracts write data WDT, a write enabling signal WEN, and a reset signal Reset from the received data, a clock crossover unit (d) 207, and a second clock signal generator 208 that operates according to the reference clock signal.

The data from a point A on the downstream line is written into the clock crossover unit (a) 202 according to the write clock signal WCL that is output from the second clock signal generator 208 operating according to the reference clock signal, and the data RDT is read out from the clock crossover unit (a) 202 according to the read clock signal RCL that is output from the first clock signal generator 203 operating according to the reference clock signal.

The write data that is output from the transmission line frame termination unit 206 is written into the clock crossover unit (d) 207 according to the regenerated clock signal $CLK_c$, and the data RDT is read out into a point A on the upstream from the clock crossover unit (D) 207 according to the read clock signal RCL that is output from the second clock signal generator 208 operating according to the reference clock signal.

A second interface unit B 15a comprises a clock regenerating unit 209 that regenerates a clock signal $CLK_d$ from the data received from the downstream line 16, a transmission line frame termination unit 210 that extracts the write data WDT, the write enabling signal WEN, and the reset signal Reset from the received data, a third clock crossover unit (b) 211, third and fourth clock signal generators 212 and 214 that operate according to the reference clock signal, a fourth clock crossover unit (c) 213, and a transmission line frame creating unit 215.

Each of the clock signal generators 203, 208, 212 and 214 is composed of a PLL.

As described above, in the transmission line between the point A and the point B, there are provided the clock crossover units for creating the transmission line frame by adding the overhead to voice data, or removing the overhead from the transmission line frame. In these clock crossover units, memory capacity that accommodates the amount of fluctuation of phase difference between the phase of the write clock signal and the phase of the read clock signal is required.

Figure 3B:
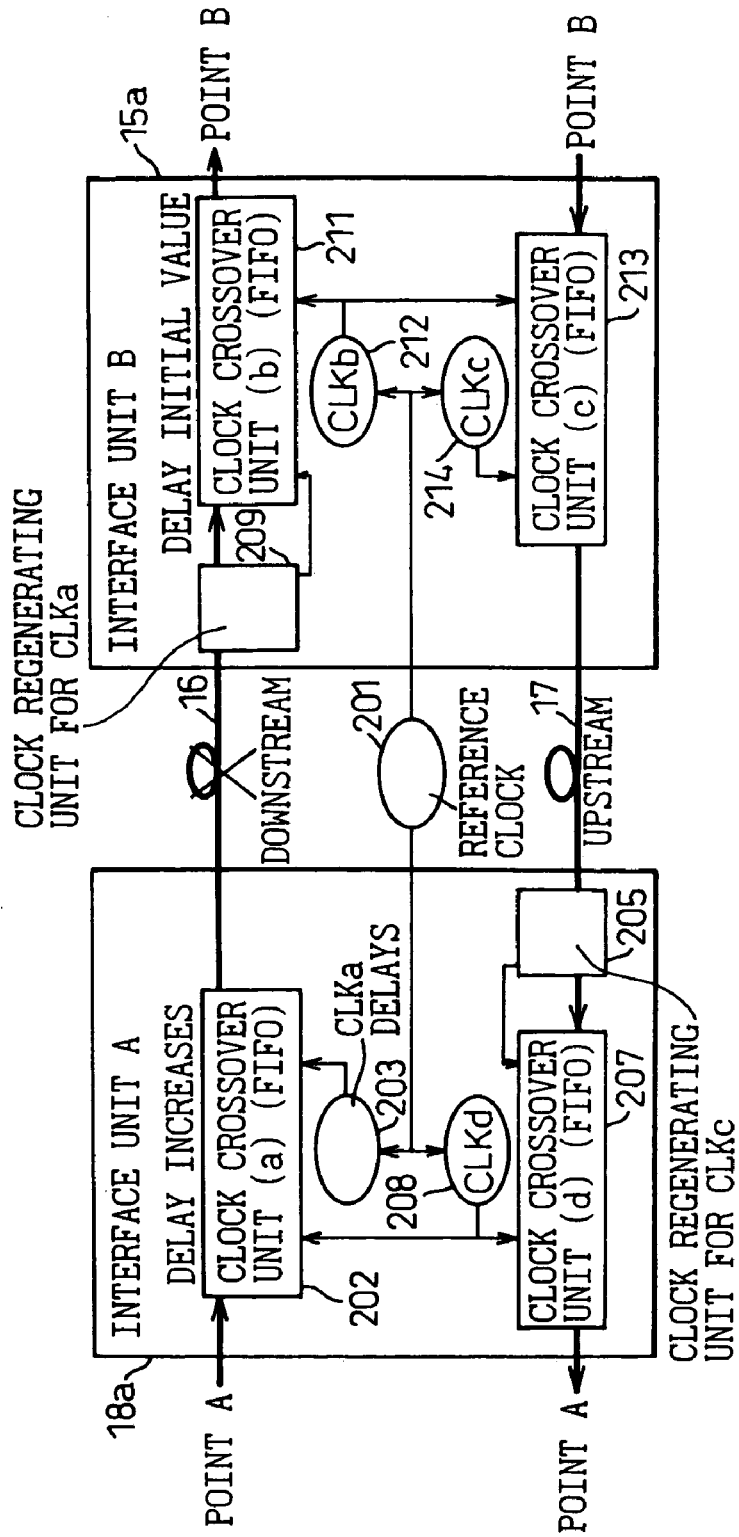

FIGS. 3A and 3B are block diagrams describing operation upon initialization after fluctuation of the clock signal in the configuration shown in FIG. 2.

In FIGS. 3A and 3B, for simplicity, the transmission frame creating units and the transmission frame termination units shown in FIG. 2 are omitted.

A normal operating state of the interface units is shown in FIG. 3A and a state when the downstream data is disconnected is shown in FIG. 3B. Thus, when the data is disconnected in the downstream or the upstream, each clock crossover unit is initialized according to the reference clock, and as a result, there is a problem in that there may be a time delay after the transmission of the data till the receipt, as described in detail later. In such distance measuring system, there may arise a problem in that the actual distance up to the portable terminal (a length of the optical transmission line and the wireless section) cannot be measured accurately if redundant signal processing time increases.

In the prior art, since the memory capacity of the clock crossover units may cause the largest delay, it is necessary to configure the clock generating units (PLLs) so that the clock generating units may have less phase fluctuation. Therefore, the properties of the PLLs have to be restricted.

Alternatively, the prior art system may be operated by limiting the applied distance range in consideration of the signal processing time described above.

Figure 4:
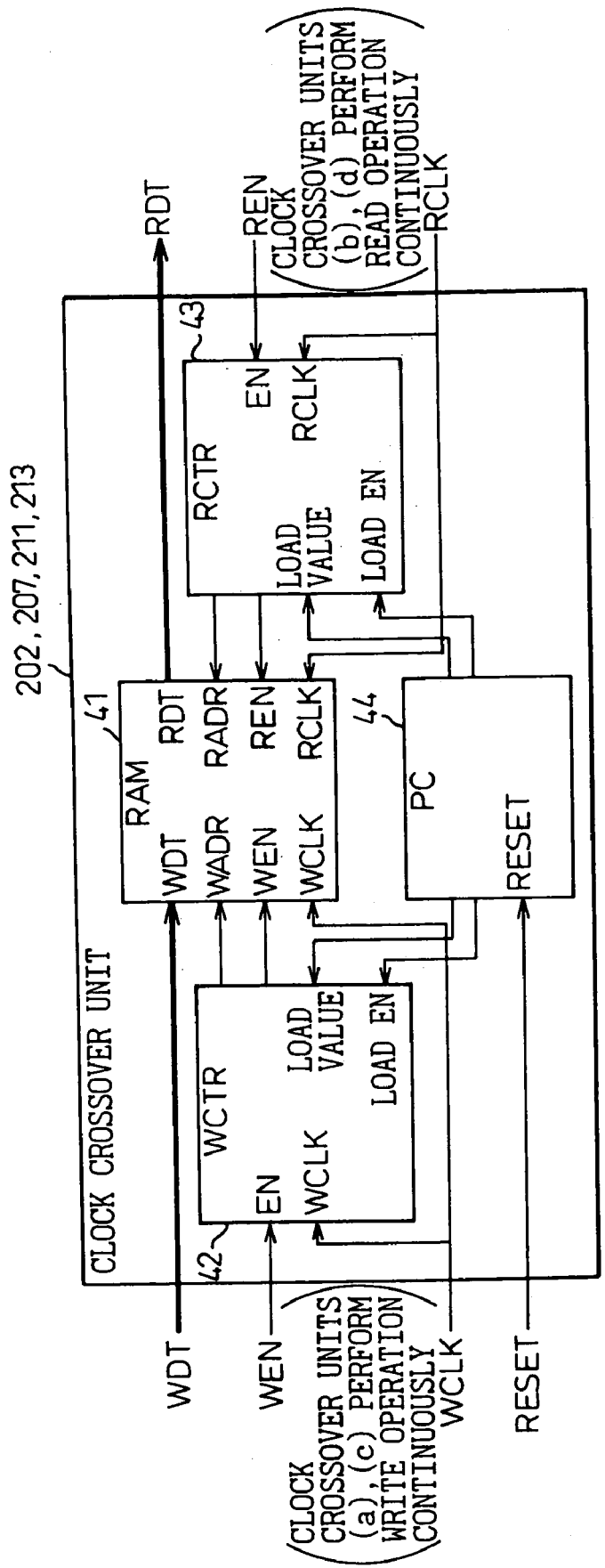
FIG. 4 is a block diagram showing a configuration of each of the clock crossover units in the configuration shown in FIG. 3.

FIG. 4 is a block diagram showing the configuration of each of the prior art clock crossover units 202, 207, 211 and 213 shown in FIGS. 3A and 3B.

Having such clock crossover units, identical data can be transmitted to a plurality of transmission channels in a transmission line section and can be received with matched phases, and therefore the data can be received from the optimal transmission channel. Operation of the clock crossover units is described in detail in an application entitled "System and Method for Phase Matching Control in Plural Transmission Channels", which was filed on the same date by the same applicant as the present application.

As shown in FIG. 4, the clock crossover unit comprises a random access memory RAM 41, a write address counter WCTR 42, a read address counter RCTR 43, and a phase controlling unit PC 44.

At its input side, the RAM 41 has an input terminal of the write data WDT, an input terminal of a write address WADR, an input terminal of the write enabling signal WEN, and an input terminal of a write clock WCLK. At its output side, the RAM 41 has an output terminal of the read data RDT, an input terminal of a read address RADR, an input terminal of a read enabling signal REN, and an input terminal of a read clock RCLK.

The write address counter WCTR 42 has an input terminal of the write enabling signal WEN and an input terminal of the write clock WCLK at its input side. The address counter WCTR 42 has an input terminal of a load value, and an input terminal of a load enabling signal at its output side.

The load value that is input to the write address counter WCTR 42 is an initial value of the phase difference between the write address WADR and the read address RADR that is calculated by the phase controlling unit PC 44. The load enabling signal to be input into the write address counter WCTR 42 is output at a time when the write enabling signal WEN is set to write inhibit, and correspondingly, the load valve is written into the write address counter WCTR 42. The write address counter WCTR 42 outputs the write address WADR that is a value for which this load value is taken into account.

The load value that is input to the read address counter RCTR 43 is a value calculated by the phase controlling unit PC 44 in order to ensure that only the data that has been written into the RAM 41 is read and the data that has not been written into the RAM 41 is not read even when the phase of the clock signal has fluctuated. The load enabling signal EN to be input into the read address counter RCTR 43 is output at a time when the read enabling signal REN is set to read inhibit, and correspondingly, the load value is written into the read address counter RCTR 43. The read address counter RCTR 43 outputs the read address RADR that is a value for which this load value is taken into account.

Upon recovery after line disconnection, the phase controlling unit PC 44 configures a frame in response to the reset signal RESET and then initializes the phase difference between the write phase and the read phase according to the frame.

The clock crossover unit (b) 211 and the clock crossover unit (d) 207 are initialized upon establishment of the transmission line frame termination.

The clock crossover unit (a) 202 and the clock crossover unit (c) 213 perform write operation continuously, while the clock crossover unit (b) 211 and the clock crossover unit (d) 207 perform read operation continuously.

Figure 5B:
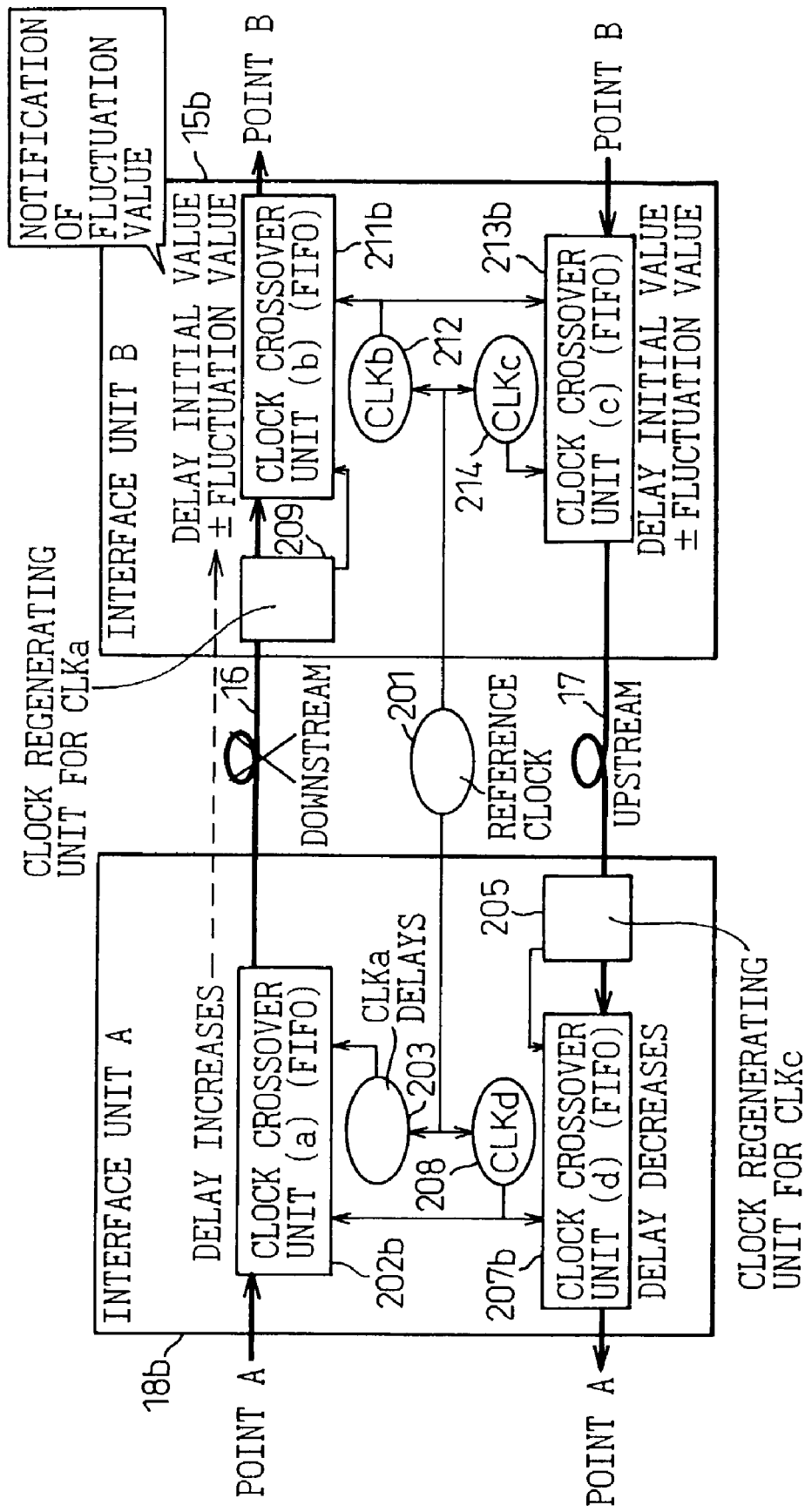

FIGS. 5A and 5B are block diagrams showing the configuration of interface units in a distance measuring system for a network synchronization method according to a first embodiment of the present invention.

The interface units shown in FIGS. 5A and 5B differ from the ones in FIG. 2 in that the clock crossover unit 211$b$ in the interface unit 15$b$ at the receiving side is notified of the amount of fluctuation from the initial value of the phase difference between the write clock signal and the read clock signal in the clock crossover unit 202$b$ in the interface unit 18$b$ at the transmitting side in the downstream by using an overhead and the like in the transmitted frame so that the amount of fluctuation is compensated for with reference to a predetermined initial phase difference value when the phase difference value between the write clock signal and the read clock signal in the clock crossover unit 211$b$ is initialized. More specifically, the amount of fluctuation is subtracted from the initial phase difference value when the amount of fluctuation has increased, while the amount of fluctuation is added to the initial phase difference value when the amount of fluctuation has decreased.

Thus, as shown in FIG. 5B, upon initialization of the write phase and the read phase of the clock crossover unit 211$b$ in the interface unit 15$b$ when the transmission line section in the downstream 16 recovers after disconnection, inverse compensation in consideration of the amount of fluctuation allows the amount of delay from a point A to a point B in the downstream to be equal to the initial state. The operation will be described in detail later in FIG. 10.

Similarly, in the upstream line 17, the clock crossover unit 207$b$ in the interface unit 18$b$ at the receiving side is notified of the amount of fluctuation from the initial value of the phase difference between the write clock signal and the read clock signal in the clock crossover unit 213$b$ in the interface unit 15$b$ at the transmitting side by using an overhead and the like in the transmitted frame so that the amount of fluctuation is compensated for with reference to a predetermined initial value when the phase difference value between the write clock signal and the read clock signal in the clock crossover unit 207$b$ is initialized.

Thus, upon initialization of the write phase and the read phase of the clock crossover unit 207$b$ in the interface unit 18$b$ when the transmission line section in the upstream line 17 recovers after disconnection, inverse compensation in consideration of the amount of fluctuation allows the amount of delay from a point B to a point A in the upstream to be equal to the initial state. The operation will be described in detail later in FIG. 11.

Figure 6:
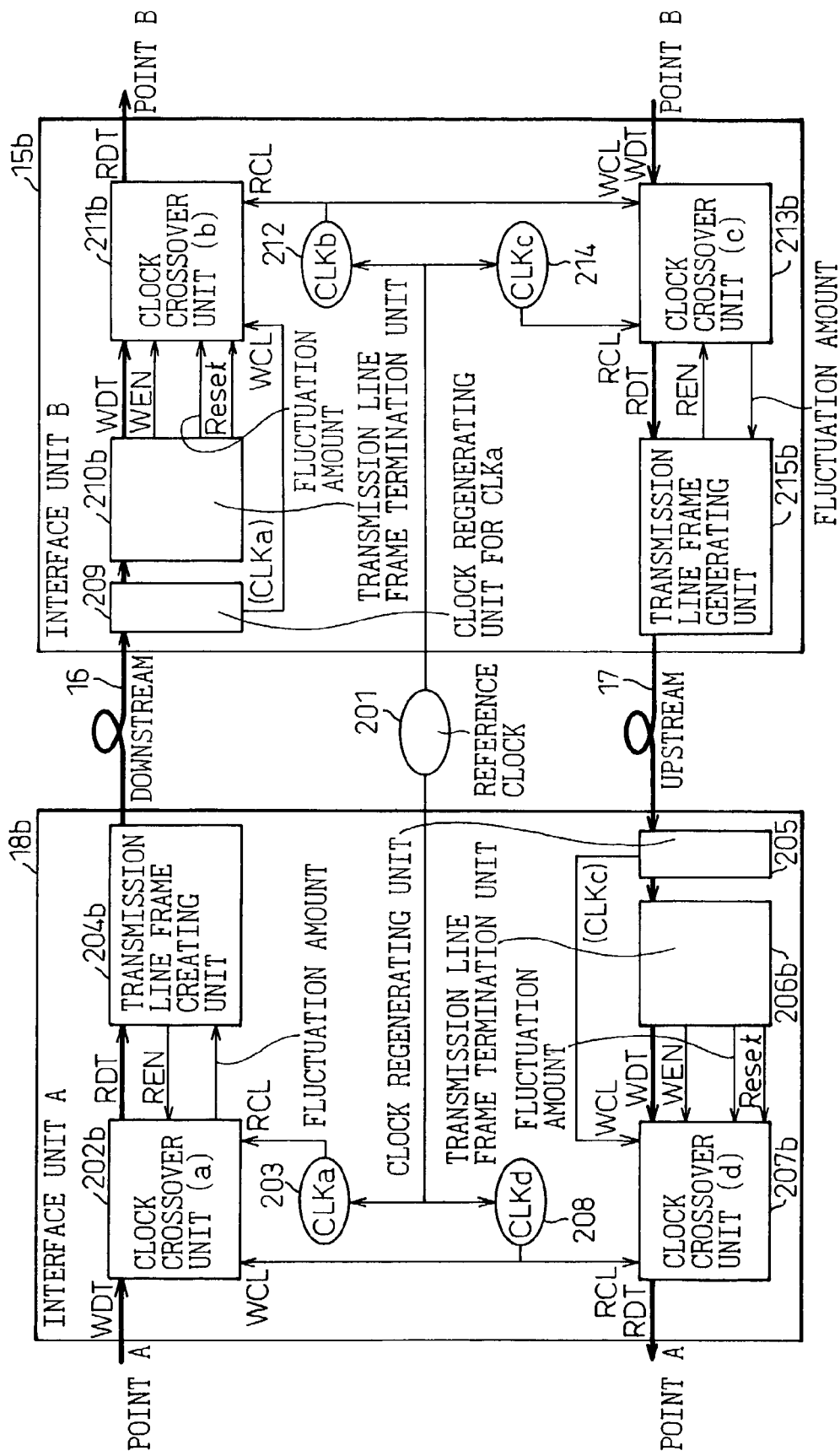
FIG. 6 is a block diagram showing the configuration of the interface units shown in FIG. 5 in more detail.

FIG. 6 is a block diagram showing the configuration of the interface units shown in FIGS. 5A and 5B in more detail.

The interface units shown in FIG. 6 differ from the ones in FIG. 2 in that, as shown in FIG. 6, the transmission line frame creating unit 204$b$ is notified of the amount of fluctuation from the initial value of the phase difference between the write phase and the read phase in the clock crossover unit (a) 202$b$ from the clock crossover unit (a) 202$b$ in the interface unit 18$b$, in that the amount of fluctuation is extracted from the transmission line frame termination unit 210$b$ in the interface unit 15$b$ and transmitted to the clock crossover unit 211$b$, in that the transmission line frame creating section 215$b$ is notified of the amount of fluctuation from the initial value of the phase difference between the write phase and the read phase in the clock crossover unit (c) 213$b$ from the clock crossover unit (c) 213$b$ in the interface unit 15$b$, and in that the amount of fluctuation is extracted from the transmission line frame termination unit 206$b$ in the interface unit 18$b$ and transmitted to the clock crossover unit 207$b$.

Figure 7:
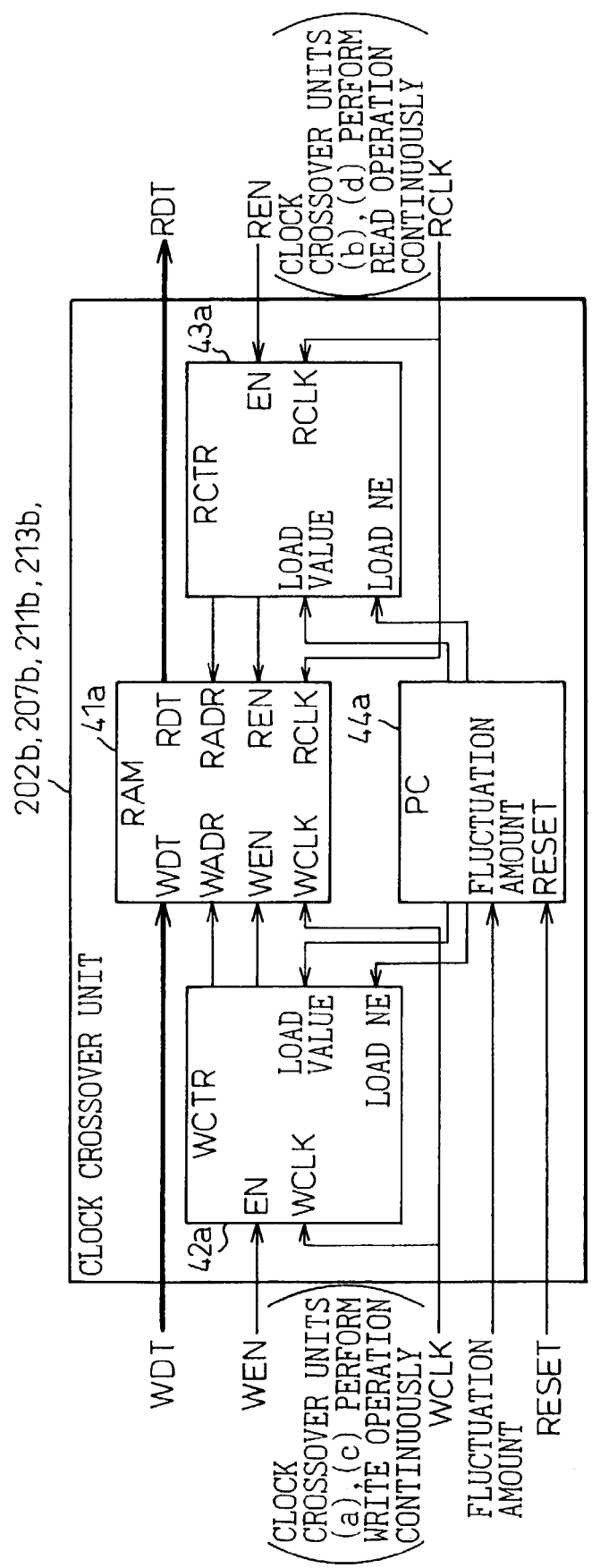
FIG. 7 is a block diagram showing each of the clock crossover units in the configuration shown in FIG. 6.

FIG. 7 is a block diagram showing each of the clock crossover units 202b, 207b, 211b and 213b in the configuration shown in FIG. 6.

The interface unit shown in FIG. 7 differs from the one in FIG. 4 in that, as shown in FIG. 7, the phase controlling unit receives the amount of fluctuation from the initial value of the phase difference between the write phase and the read phase in the clock crossover unit, and in that the phase controlling unit PC 44a initializes the phase difference between the write phase and the read phase in consideration of the amount of fluctuation when it receives the RESET signal at the time of recovery after the line is disconnected.

Figure 8:
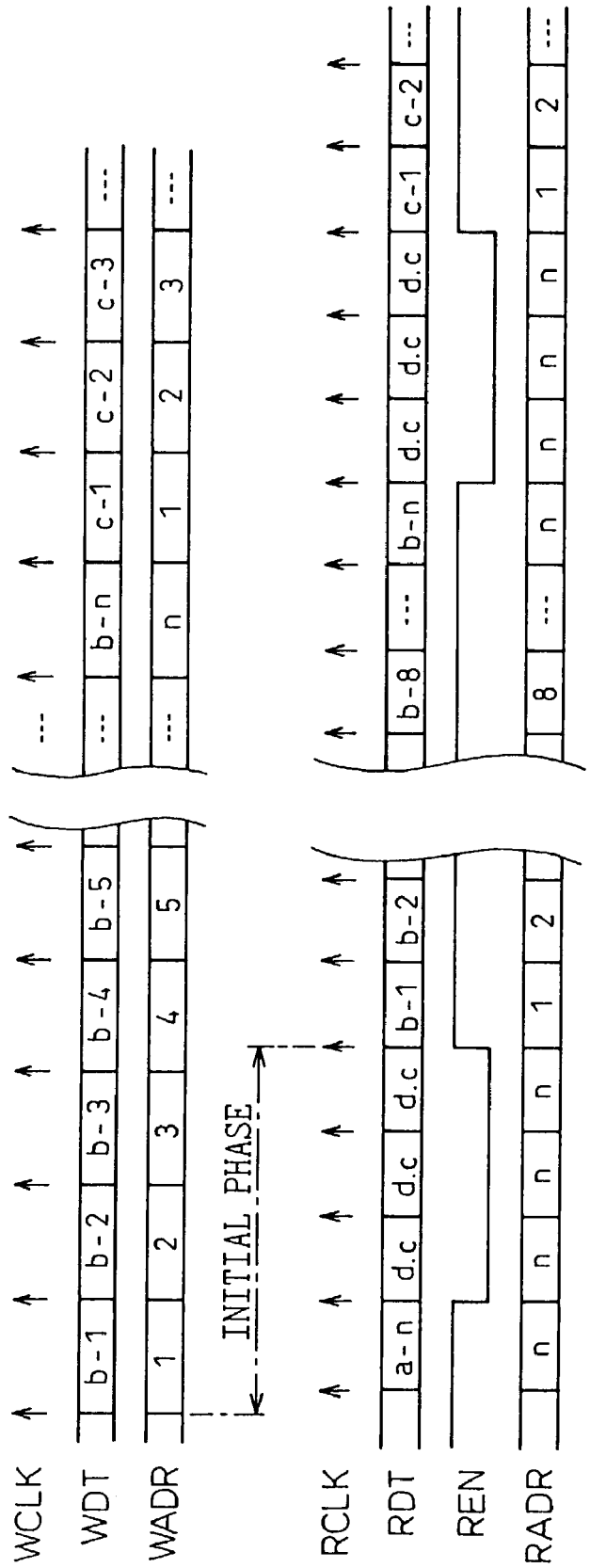
FIG. 8 is a time chart describing operation of the clock crossover unit (a) 202$b$ and the clock crossover unit (c) 213$b$ that are among a plurality of the clock crossover units shown in FIG. 7 and perform write operations continuously.

FIG. 8 is a time chart describing operation of the clock crossover unit (a) 202b and the clock crossover unit (c) 213b that are among a plurality of the clock crossover units shown in FIG. 7 and perform write operation continuously. As shown in FIG. 8, at the time of writing into the RAM 41a, the write address WADR is input from the write address counter WCTR 42a to the RAM 41a according to the write clock signal WCLK that counts from 1 to n repeatedly, on the basis of which the write data WDT is written into the RAM 41a.

At the time of reading from the RAM 41a, the read address RADR is input from the read address counter RCTR 43a to the RAM 41a according to the read clock signal WCLK that counts from 1 to n repeatedly, on the basis of which the read data RDT is read from the RAM 41a. Thus, the clock crossover unit (a) 202b and the clock crossover unit (b) 213b form a FIFO.

The read address RADR is input with a delay corresponding to the initial phase after the corresponding write address WADR. This phase delay is needed in order to ensure that the read operation is performed after completion of the write operation even if clock fluctuation has occurred. Though the initial phase of 4 clocks is illustrated in the drawing, this initial phase may involve more or less than 4 clocks so long as it is ensured that the read operation is performed after the write operation.

Further, the read enabling signal REN becomes low-level not less than once during one frame of the read data RDT. In the drawing, the read enabling signal REN is low-level during three clocks after the period when the read address is n. While the read enabling signal REN is low-level, the read address is kept to be n and dummy data is inserted into the read data RDT. This dummy data part forms an overhead of the frame, into which the amount of fluctuation from the initial value of the phase difference between the write phase and the read phase in the clock crossover unit (a) 202b and the clock crossover unit (c) 213b is inserted according to the present invention along with a synchronization signal and a pointer value for matching phases in plural channels.

Figure 9:
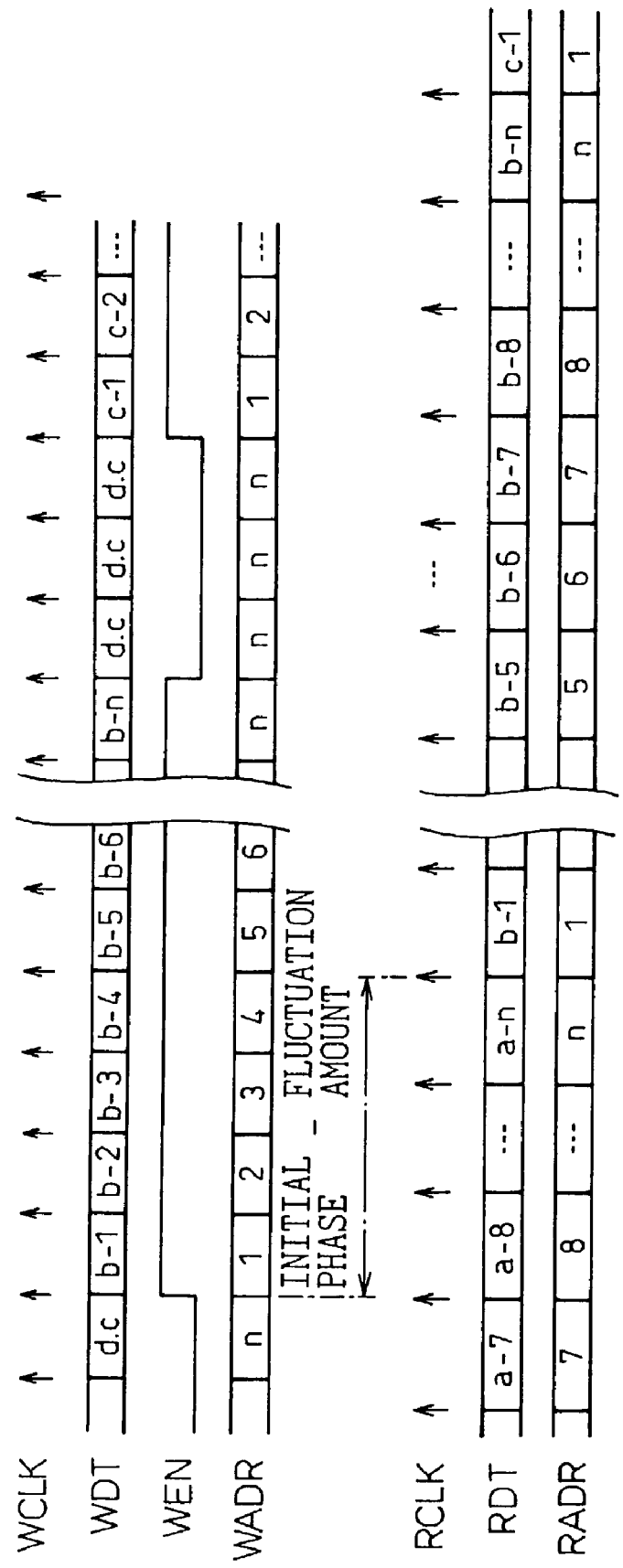
FIG. 9 is a time chart describing operation of the clock crossover unit (b) 211$b$ and the clock crossover unit (d) 207$b$ that are among the plurality of clock crossover units shown in FIG. 7 and perform read operations continuously.

FIG. 9 is a time chart describing operation of the clock crossover unit (b) 211b and the clock crossover unit (d) 207b that are among the plurality of the clock crossover units shown in FIG. 7 and perform read operation continuously. In FIG. 9, at the time of writing into the RAM 41a, the write address WADR is input from the write address counter WCTR 42a to the RAM 41a according to the write clock signal WCLK that counts from 1 to n repeatedly, on the basis of which the write data WDT is written into the RAM 41a. However, at this time, while the write enabling signal WEN is low-level, the write address is kept to be the immediately preceding value (n in the drawing) and dummy data is inserted into the write data WDT. This dummy data part forms an overhead of the frame, into which the amount of fluctuation from the initial value of the phase difference between the write phase and the read phase in the clock crossover unit (a) 202b and the clock crossover unit (c) 213b that is sent from the clock crossover unit (a) 202b and the clock crossover unit (c) 213b is inserted according to the present invention along with a synchronization signal and a pointer value for matching phases in plural channels.

At the time of reading from the RAM 41a, the read address RADR is input from the read address counter RCTR 43a to the RAM 41a according to the read clock signal WCLK that counts from 1 to n repeatedly, on the basis of which the read data RDT is read from the RAM 41a. Thus, the clock crossover unit (b) 211b and the clock crossover unit (d) 207b also form a FIFO.

The phase at the time of reading is the initial phase shown in FIG. 8, with the addition of the amount of fluctuation. As shown, while the initial phase involving 4 clocks is illustrated in FIG. 8, it becomes 3 clocks by subtracting the amount of fluctuation of one clock in FIG. 9.

Figure 10:
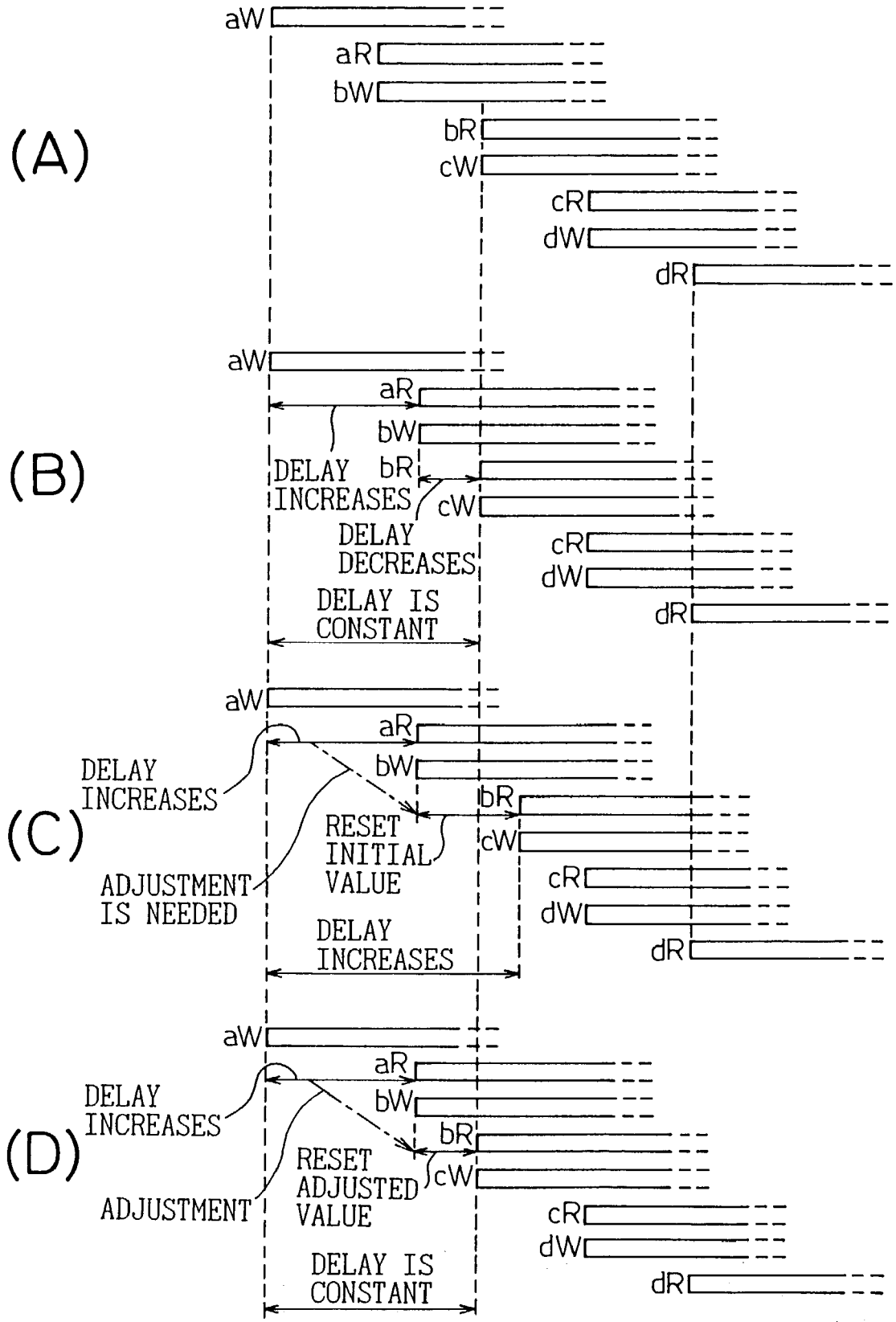
FIG. 10 shows time charts describing an effect of this embodiment when a downstream line is disconnected in the network synchronization method described in FIGS. 5–9.

FIG. 10 shows time charts describing an effect of this embodiment when a downstream line is disconnected in the network synchronization method described in FIGS. 5A, 5B, and 6–9.

In FIG. 10, (A) is a time chart showing the write phase and the read phase of the clock crossover unit to which the present invention is not applied as shown in FIG. 2 or FIGS. 3A and 3B in normal operation, (B) is a time chart showing the write phase and the read phase of the clock crossover unit when the read phase of the clock crossover unit (a) 202 is delayed in comparison to the initial value in the interface units to which the present invention is not applied as shown in FIG. 2 or FIGS. 3A and 3B, (C) is a time chart showing the case when the read phase of the clock crossover unit (a) 202 is delayed in comparison to the initial value and the difference between the write phase and the read phase of the clock crossover unit (b) 211 is reset to the initial value at the time of line recovery after the transmission line section in the downstream 16 has been disconnected in the interface units to which the present invention is not applied as shown in FIG. 2 or FIGS. 3A and 3B, and (D) is a time chart showing the case when the read phase of the clock crossover unit (a) 202b is delayed in comparison to the initial value and the difference between the write phase and the read phase of the clock crossover unit (b) 211b is reset to the initial value at the time of line recovery after the transmission line section in the downstream 16 has been disconnected in the interface units according to the first embodiment of the present invention as shown in FIGS. 5A. 5B, and 6–7.

In FIG. 10, aW designates the write phase to the clock crossover unit (a) 202 or 202b, aR designates the read phase from the clock crossover unit (a) 202 or 202b, bW designates the write phase to the clock crossover unit (b) 211 or 211b, bR designates the read phase from the clock crossover unit (b) 211 or 211b, cW designates the write phase to the clock crossover unit (c) 213 or 213b, cR designates the read phase from the clock crossover unit (b) 213 or 213b, dW designates the write phase to the clock crossover unit (b) 207 or 207b, and dR designates the read phase from the clock crossover unit (b) 207 or 207b.

As shown in (A) in FIG. 10, in normal operation, all of the phase differences between the write phase and the read phase remain at the initial value, and therefore the amount of delay from the write phase aW of the clock crossover unit (a) 202 or 202b to the read phase bR of the clock crossover unit (b) 211 or 211b is constant.

Further, as shown in (B) in FIG. 10, even if the delay in the read phase aR from the clock crossover unit (a) increases due to fluctuation of the clock signal generator 203 and the like, since the read phase from the clock crossover unit (b) 211 or 211b and the write phase cW to the clock crossover unit (c) 213 or 213b are determined by the clock signal generator 212 that runs according to the reference clock so long as the downstream line 16 is not disconnected, the read phase and the write phase are not affected by delay in the read phase aR from the clock crossover unit (a). Therefore, the amount of delay in the read phase bR from the clock crossover unit (b) 211 or 211b decreases with respect to the write phase bW to the clock crossover unit (b) 211 or 211b, and consequently, the amount of delay from the write phase aW of the clock crossover unit (a) 202 or 202b to the read phase bR of the clock crossover unit (b) 211 or 211b remains constant.

However, as shown in (C) in FIG. 10, at the time of recovery after the downstream line is disconnected, the phase difference between the write phase bW and the read phase bR in the clock crossover unit (b) 211 as shown in FIGS. 2,3A, and 3B to which the present invention is not applied, is reset to the initial value. Therefore, when the delay in the read phase aR from the clock crossover unit (a) 202 increases, the write phase bW to the clock crossover unit (b) 211, the write operation to which is performed according to the regenerated clock, is also delayed similarly to the read phase aR, and the read operation from the clock crossover unit (b) 211 is performed in the read phase bR with the initialized delay amount, and consequently the amount of delay from the write phase aW of the clock crossover unit (a) 202 or 202b to the read phase bR of the clock crossover unit (b) 211 or 211b increases.

In order to prevent the overall delay from increasing due to the initialization of the delay amount in each clock crossover unit at the time of recovery after the line is disconnected as shown in (C) in FIG. 10, the first embodiment of the present invention takes the amount of fluctuation into account when the delay amount in each clock crossover unit is initialized at the time of recovery after the line is disconnected. More specifically, as shown in (D) in FIG. 10, when the delay in the read phase aR from the clock crossover unit (a) 202b increases, in the clock crossover unit (b) 211b which is notified of the amount of fluctuation from the initial value of the phase difference between the write phase and the read phase in advance, the phase difference between the write phase and the read phase is initialized with the amount of fluctuation being subtracted at the time of recovery after the downstream line 16 is disconnected. This allows the amount of delay from the write phase aW of the clock crossover unit (a) 202b to the read phase bR of the clock crossover unit (b) 211b to be constant. When the read phase aR decreases, the amount of decrease is added to the initial value of the phase difference at the time of recovery after the downstream line 16 is disconnected.

Figure 11:
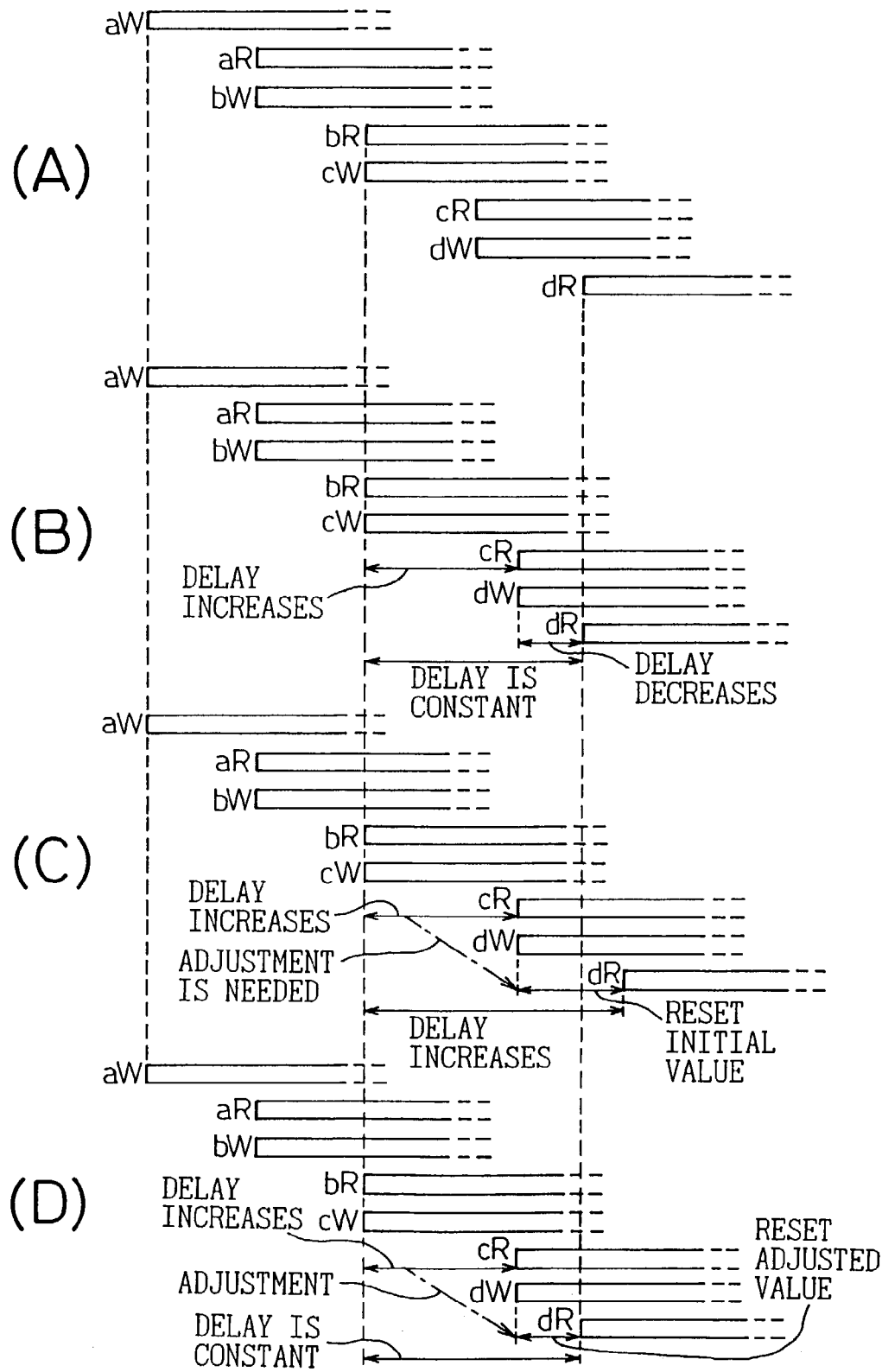
FIG. 11 is a time chart describing an effect of this embodiment when an upstream line is disconnected in the network synchronization method described in FIGS. 5–9.

FIG. 11 is a time chart describing an effect of this embodiment when the upstream line is disconnected in the network synchronization method described in FIGS. 5A, 5B, and 6–9.

In FIG. 11, (A) in FIG. 11 is a time chart showing the write phase and the read phase of the clock crossover unit in the interface unit to which the present invention is not applied as shown in FIG. 2 or FIGS. 3A and 3B in normal operation, (B) in FIG. 11 is a time chart showing the write phase and the read phase of the clock crossover unit when the read phase cR of the clock crossover unit (c) 213 is delayed in comparison with the initial value in the interface units to which the present invention is not applied as shown in FIG. 2 or FIGS. 3A and 3B, (C) in FIG. 11 is a time chart showing the case when the read phase cR of the clock crossover unit (c) 213 is delayed in comparison with the initial value and the difference between the write phase and the read phase of the clock crossover unit (d) 207 is reset to the initial value at the time of line recovery after the transmission line section in the upstream 17 has been disconnected in the interface units to which the present invention is not applied as shown in FIG. 2 or FIGS 3A and 3B and (D) in FIG. 11 is a time chart showing the case when the read phase of the clock crossover unit (c) 213b is delayed in comparison with the initial value and the difference between the write phase and the read phase of the clock crossover unit (d) 207b is reset to the initial value at the time of line recovery after the transmission line section in the upstream 17 has been disconnected in the interface units according to the first embodiment of the present invention as shown in FIGS. 5A, 5B, and 6–7.

Similar to FIG. 10, according to the first embodiment of the present invention, as shown in (D) in FIG. 11, in the clock crossover unit (d) 207b which is notified in advance of the amount of fluctuation from the initial value of the phase difference between the write phase cW and the read phase cR in the clock crossover unit (c) 213b, the phase difference between the write phase and the read phase is initialized with the amount of fluctuation being taken into account at the time of recovery after the upstream line 17 is disconnected. This allows the amount of delay from the write phase cW of the clock crossover unit (c) 213b to the read phase dR of the clock crossover unit (d) 207b to be constant.

Next, the slave synchronization system will be described.

Figure 12:
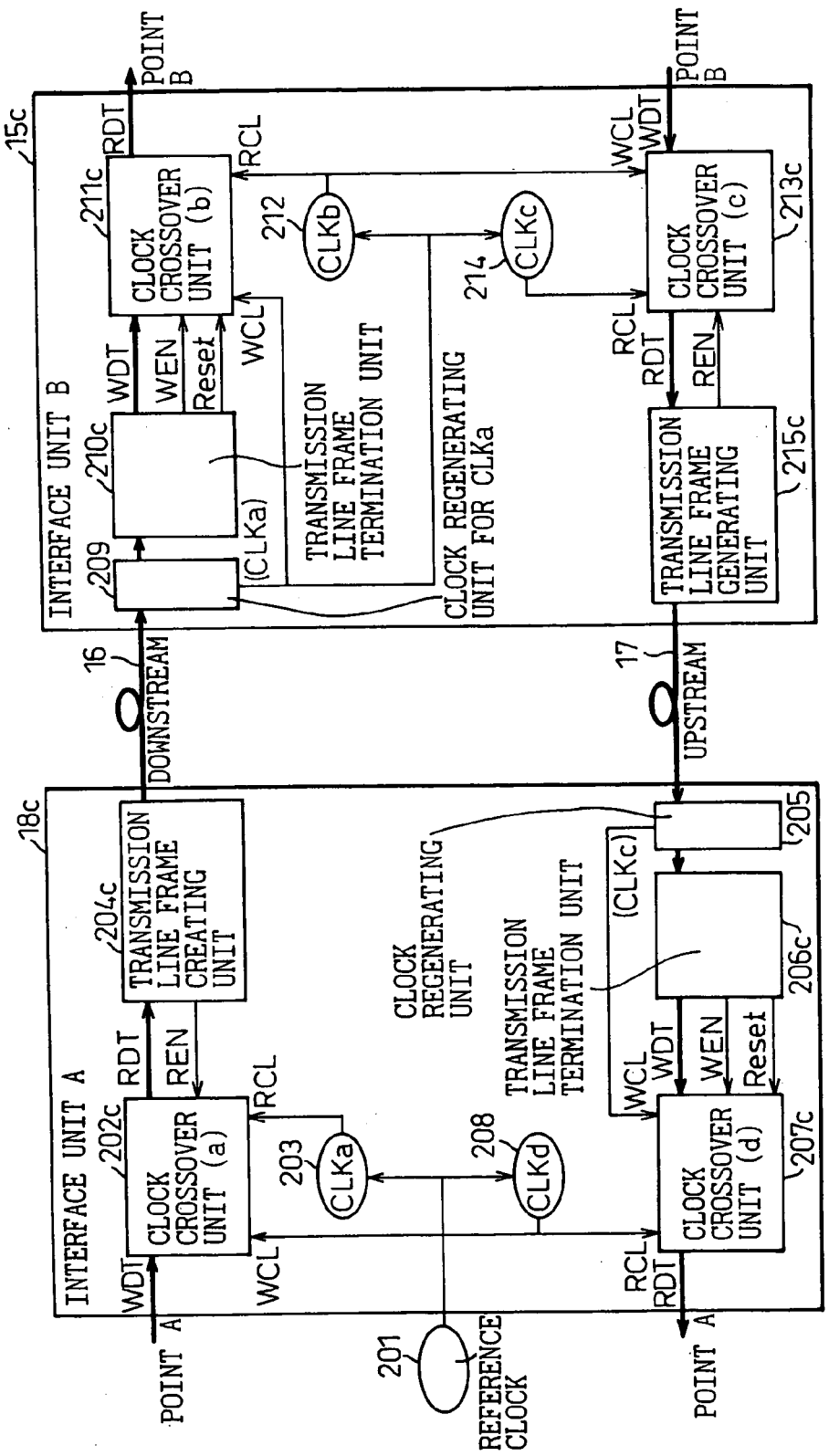
FIG. 12 is a block diagram showing a configuration of interface units for slave synchronization conceivable before development of the present invention.

FIG. 12 is a block diagram showing a configuration of interface units for slave synchronization that may be conceivable before development of the present invention.

The interface units shown in FIG. 12 differ from those in FIG. 2 in that the reference clock signal generator 201 is connected to the clock signal generators 203 and 208 in the interface unit A 18c only, and the clock signal generators 212 and 214 in the interface unit B 15c operate according to the regenerated clock signal that is regenerated from the data received by the clock regenerating unit 209, but the other configuration is same as that shown in FIG. 2, and thus a detailed description thereof is omitted.

Figure 13A:
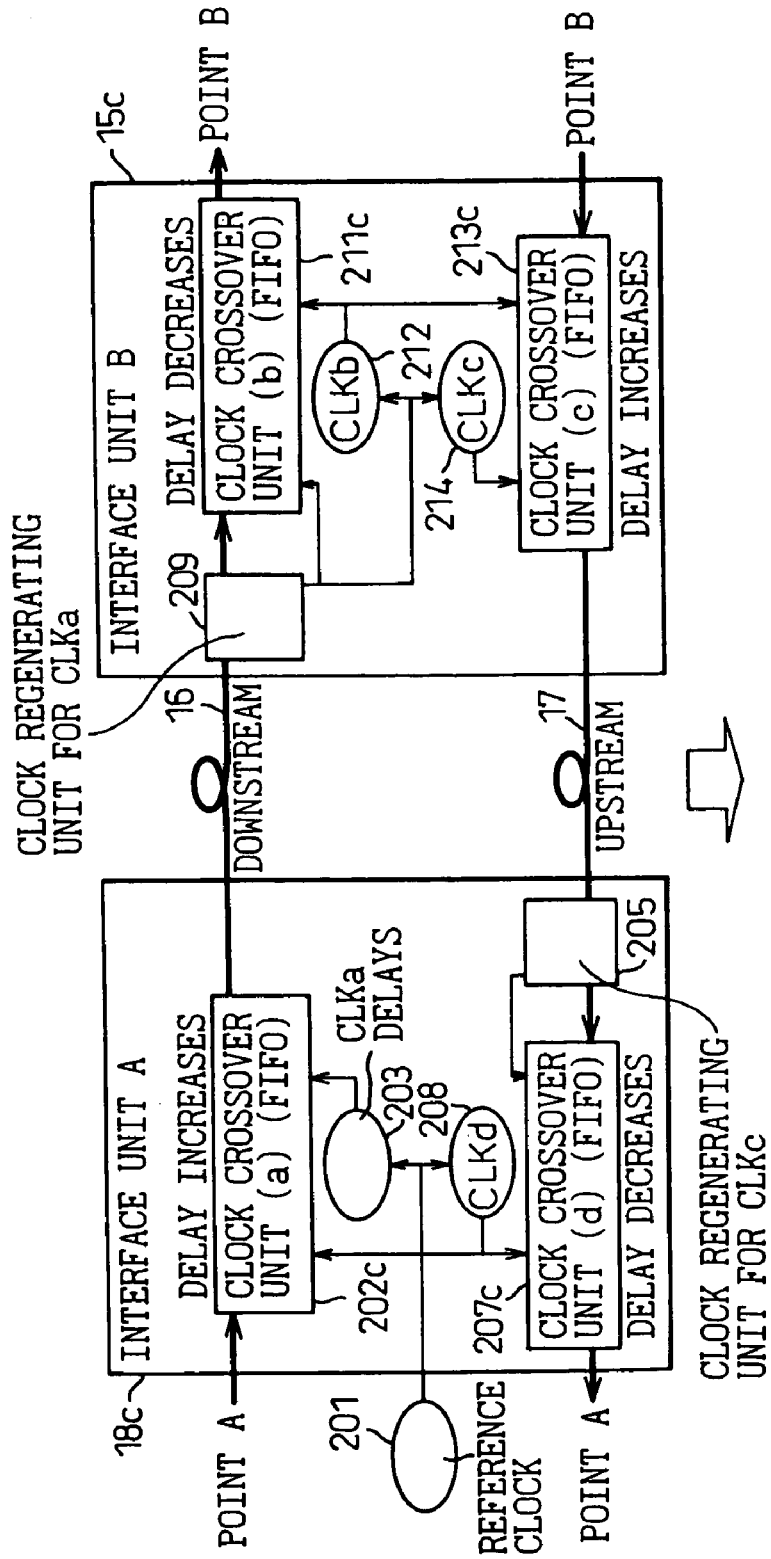

FIGS. 13A and 13B are block diagrams describing operation upon initialization after clock fluctuation in the configuration of FIG. 12.

The configuration in FIGS. 13A and 13B differ from those in FIGS. 3A and 3B in that, as described above with reference to FIG. 12, the reference clock signal generator 201 controls the clock signal generators 203 and 208 in the interface unit A 18c only. Also in this case, similar to FIGS. 3A and 3B, when the clock crossover units are initialized at the time of recovery after the line of the downstream line 16 or the upstream line 17 is disconnected, there is a problem in that the amount of the delay difference between the write phase to the clock crossover units at the transmitting side and the read phase from the clock crossover units at the receiving side may increase, as described in detail later with reference to FIG. 16 and 17.

Figure 14A:
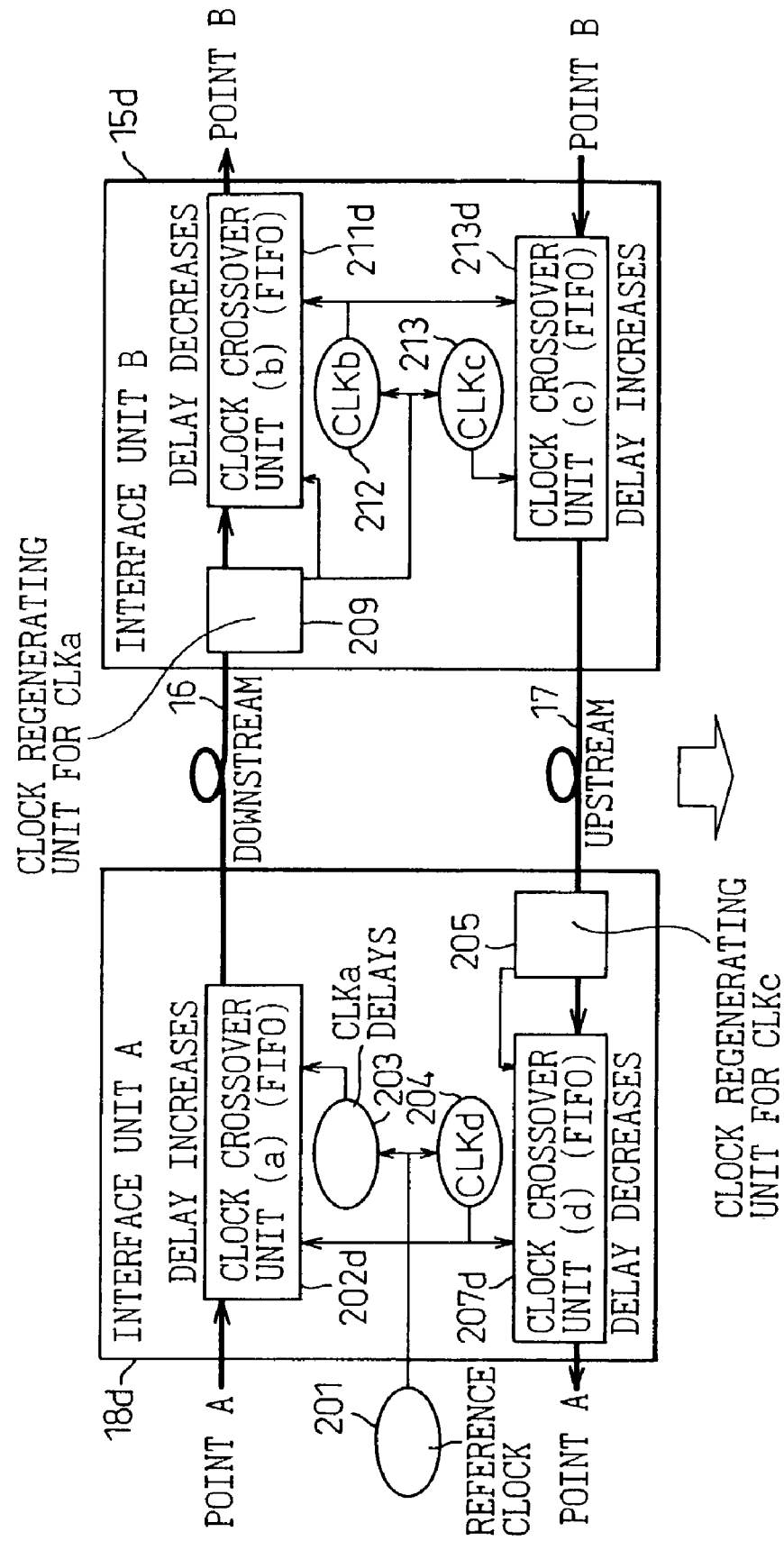
FIGS. 14A and 14B are block diagrams showing a configuration of interface units in a distance measuring system for a slave synchronization method according to a second embodiment of the present invention.
Figure 14B:
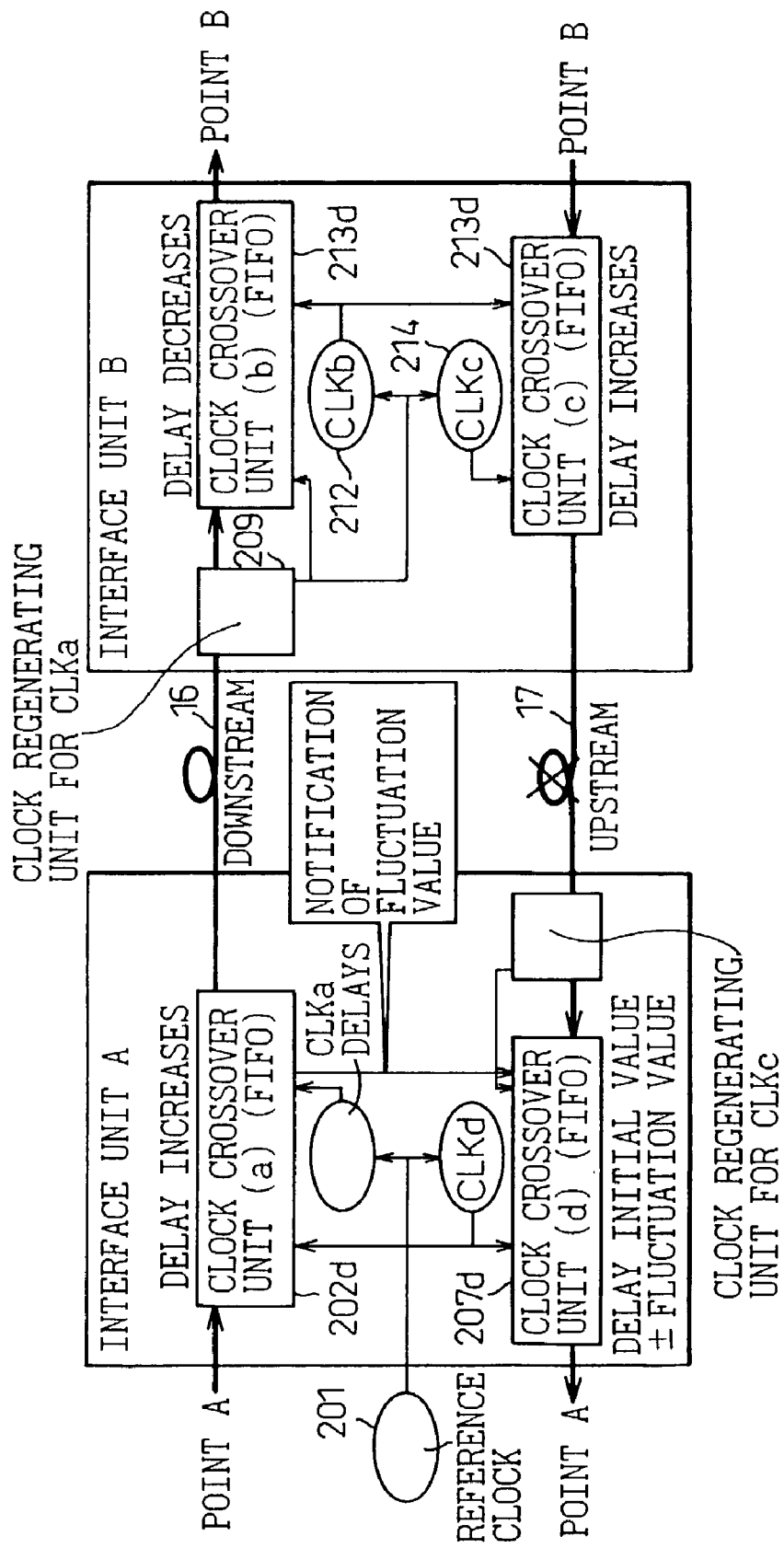

FIGS. 14A and 14B are block diagrams showing a configuration of interface units in a distance measuring system for a slave synchronization system according to a second embodiment of the present invention.

The configuration in FIGS. 14A and 14B differ from those in FIGS. 13A and 13B in that the clock crossover unit 207d at the interface unit A 18d is notified of the amount of fluctuation from the initial value of the phase difference between the write clock signal and the read clock signal of the clock crossover unit 202d at the transmitting side in the same interface unit A 18*d*, and when the phase difference between the write clock signal and the read clock signal of the clock crossover unit 207*d* is initialized, a predetermined initial phase difference is adjusted, taking the amount of fluctuation into account.

Thus, as shown in FIG. 14B, upon initialization of the write phase and the read phase of the clock crossover unit 207*d* in the interface unit 18*d* when the transmission line section in the upstream line 17 recovers after disconnection, inverse compensation in consideration of the amount of fluctuation enables the amount of delay from a point B to a point A in the upstream to be equal to the initial state. The operation will be described in detail later in FIG. 16.

When the transmission line section in the downstream is recovered after disconnection, by initializing the write phase and the read phase of the clock crossover units (b) 211*d* and (c) 213*d* in the interface unit 15*d*, initializing the write phase and the read phase of the clock crossover unit (d) 207*d* in the interface unit 18*d*, and notifying the clock crossover unit (d) 207*d* of the amount of phase fluctuation from the clock crossover unit (a) 202*d*, the amount of delay from the point A to the point B can be equal to the initial state. The operation will be described in detail later in FIG. 17.

Figure 15:
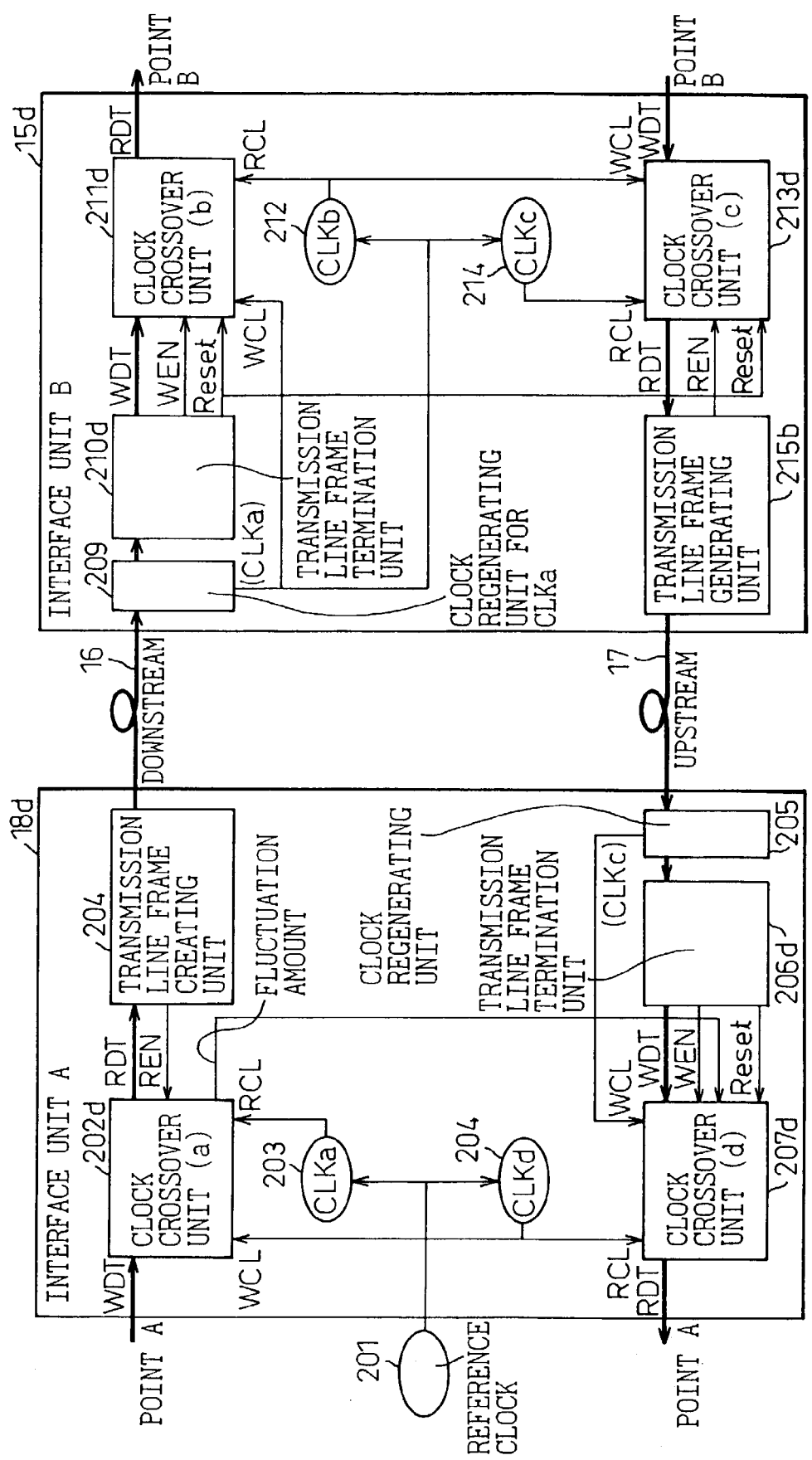
FIG. 15 is a block diagram showing the configuration of the interface units shown in FIG. 14 in more detail.

FIG. 15 is a block diagram showing the configuration of the interface units in FIGS. 14A and 14B in more detail.

The interface units shown in FIG. 15 differ from those in FIG. 12 in that, as shown in FIG. 15, the clock crossover unit (d) 207*d* is notified of the amount of fluctuation from the initial value of the phase difference between the write phase and the read phase in the clock crossover unit (a) 202*d* from the clock crossover unit (a) 202*d* in the interface unit 18*d*.

Figure 16:
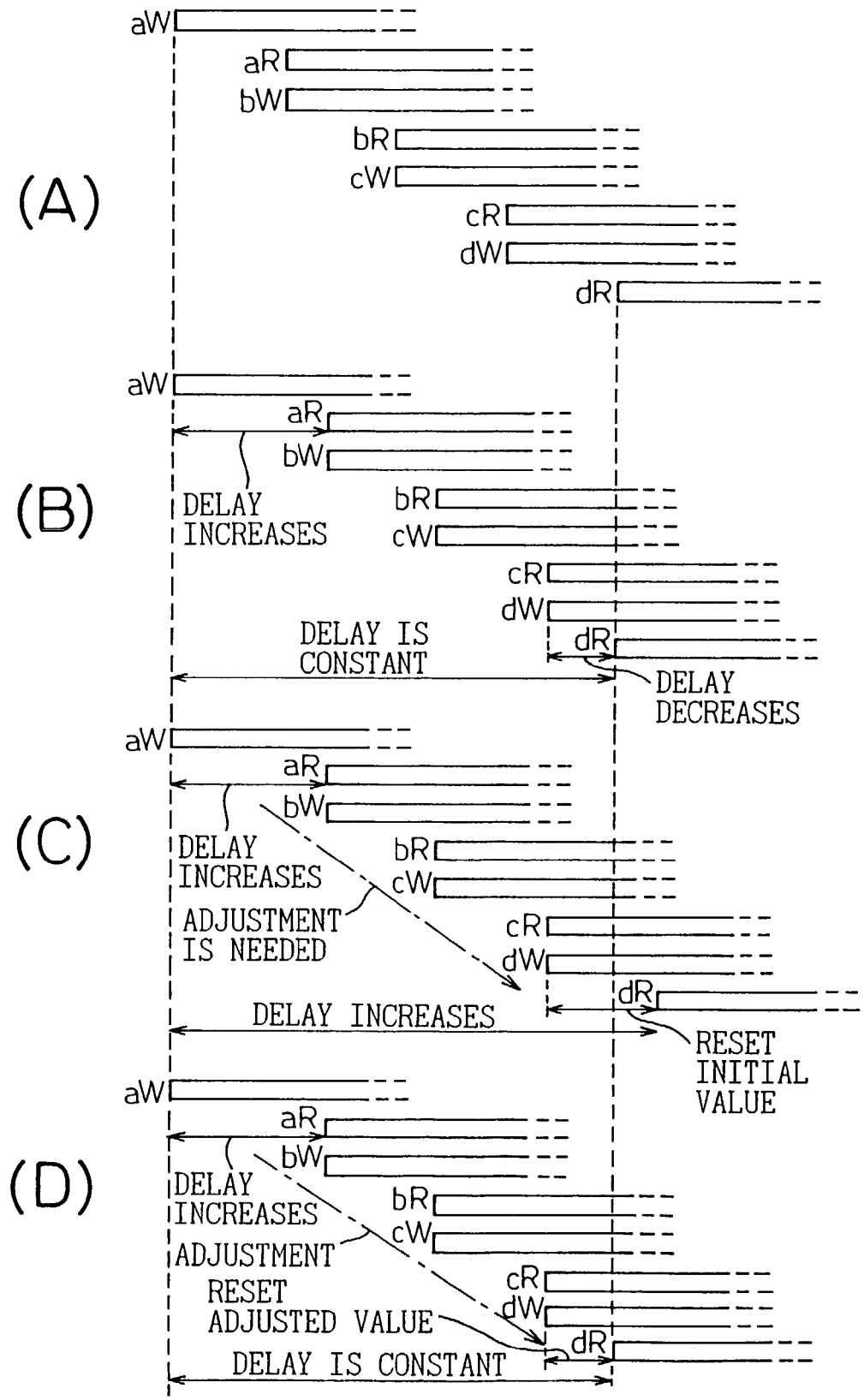
FIG. 16 is a time chart describing an effect of this embodiment when an upstream line 17 is disconnected in the slave synchronization method described in FIG. 12–15.

FIG. 16 is a time chart describing an effect of this embodiment when the upstream 17 is disconnected in the slave synchronization method described in FIGS. 12–15.

In FIG. 16, (A) is a time chart showing the write phase and the read phase of the clock crossover unit in the interface unit to which the present invention is not applied as shown in FIG. 12 or FIGS. 13A and 13B in normal operation, (B) is a time chart showing the write phase and the read phase of the clock crossover unit when the read phase of the clock crossover unit (a) 202*c* is delayed in comparison to the initial value in the interface units to which the present invention is not applied as shown in FIG. 12 or FIGS. 13A and 13B, (C) is a time chart showing the case when the read phase of the clock crossover unit (a) 202*c* is delayed in comparison with the initial value and the difference between the write phase and the read phase of the clock crossover unit (b) 207*d* is reset to the initial value at the time of line recovery after the transmission line section in the upstream line 17 has been disconnected in the interface units to which the present invention is not applied as shown in FIG. 12 or FIGS. 13A and 13B, and (D) is a time chart showing the case when the read phase of the clock crossover unit (a) 202*d* is delayed in comparison with the initial value and the difference between the write phase and the read phase of the clock crossover unit (b) 207*d* is reset to the initial value at the time of recovery after the transmission line section in the upstream line 17 is disconnected in the interface units according to the second embodiment of the present invention as shown in FIGS. 14A, 14B, and 15.

In FIG. 16, aW designates the write phase to the clock crossover unit (a) 202*c* or 202*d*, aR designates the read phase from the clock crossover unit (a) 202*c* or 202*d*, bW designates the write phase to the clock crossover unit (b) 211*c* or 211*d*, bR designates the read phase from the clock crossover unit (b) 211*c* or 211*d*, cW designates the write phase to the clock crossover unit (c) 213*c* or 213*d*, cR designates the read phase from the clock crossover unit (b) 213*c* or 213*d*, dW designates the write phase to the clock crossover unit (b) 207*c* or 207*d*, and dR designates the read phase from the clock crossover unit (b) 207*c* or 207*d*.

As shown in (A) in FIG. 16, in normal operation, the phase difference between the write phase and the read phase remain to be the initial value, and therefore the amount of delay from the write phase aW of the clock crossover unit (a) 202*c* or 202*d* to the read phase dR of the clock crossover unit (d) 207*c* or 207*d* is constant.

Further, as shown in (B) in FIG. 16, when the delay in the read phase aR from the clock crossover unit (a) 202*c* or 202*d* increases due to fluctuation of the clock signal generator 203 and the like, since the clock crossover units (b) 211*c* and 211*d* operate according to the regenerated clock, the write phase and the read phase of the clock crossover units (c) 213*c* and 213*d* are delayed according to the increase of the delay of the read phase aR, but the read phase dR of the clock crossover unit (d) 207*c* or 207*d* is not delayed, since the clock crossover unit (d) 207*c* or 207*d* operates according to the reference clock. Therefore, the amount of delay from the write phase aW of the clock crossover unit (a) 202*c* or 202*d* to the read phase bR of the clock crossover unit (d) 207*c* or 207*d* remains constant.

However, as shown in (C) in FIG. 16, at the time of recovery after the upstream line is disconnected, the phase difference between the write phase dW and the read phase dR of the clock crossover unit (d) 207*c* as shown in FIGS. 12, 13A, and 13B, to which the present invention is not applied, is reset to the initial value with reference to the read phase dR. Therefore, the amount of delay from the write phase aW of the clock crossover unit (a) 202*c* to the read phase dR of the clock crossover unit (d) 207*c* increases.

In order to prevent the overall delay from increasing due to the initialization of the delay difference between the write phase and the read phase in the clock crossover unit (d) 207*c* at the time of recovery after the upstream line 17 is disconnected, the second embodiment of the present invention takes the amount of fluctuation of the phase difference in the clock crossover unit (a) 202*c* into account when the phase difference in the clock crossover unit (d) 207*c* is initialized at the time of recovery after the line is disconnected. More specifically, as shown in (D) in FIG. 16, when the delay of the read phase aR from the clock crossover unit (a) 202*d* increases, in the clock crossover unit (d) 207*d* which is notified of the amount of fluctuation from the initial value of the phase difference between the write phase and the read phase in advance, the phase difference between the write phase and the read phase of the clock crossover unit (d) 207*d* is initialized with the amount of fluctuation being subtracted at the time of recovery after the upstream line 17 is disconnected. This enables the amount of delay from the write phase aW of the clock crossover unit (a) 202*d* to the read phase dR of the clock crossover unit (d) 207*d* to be constant.

Figure 17:
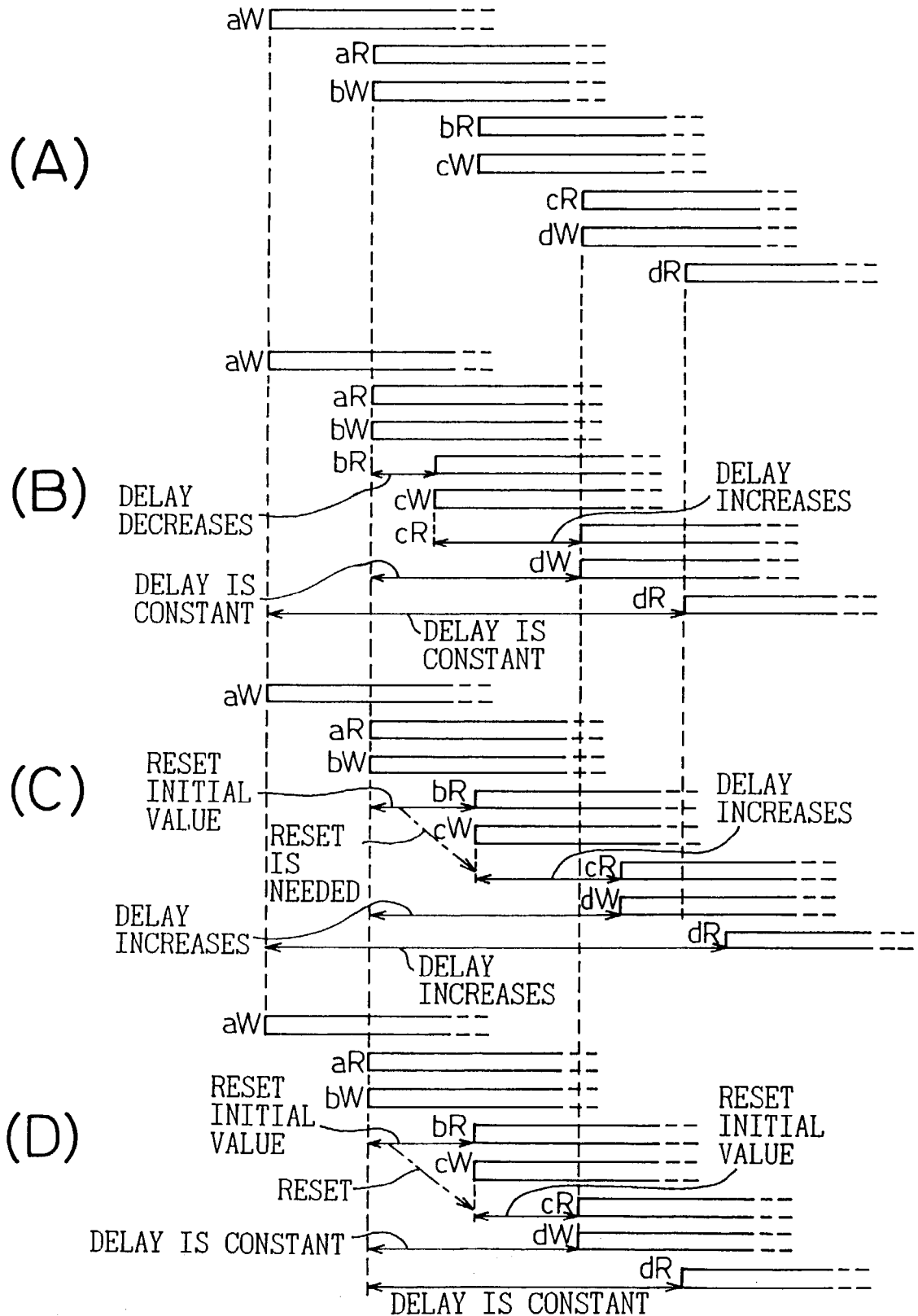
FIG. 17 is a time chart describing an effect of this embodiment when a downstream line 16 is disconnected in the slave synchronization method described in FIG. 14–15.

FIG. 17 is a time chart describing an effect of this embodiment when the downstream 16 is disconnected in the slave synchronization method described in FIGS. 14A, 14B, and 15.

In FIG. 17, (A) is a time chart showing the write phase and the read phase of the clock crossover unit in the interface unit to which the present invention is not applied as shown in FIG. 12 or FIGS. 13A and 13B in normal operation, (B) is a time chart showing the write phase and the read phase of the clock crossover unit when the read phase bR of the clock crossover unit (b) 211*c* is delayed in comparison to the initial value in the interface units to which the present invention is not applied as shown in FIG. 12 or FIGS. 13A and 13B, (C) is a time chart showing a problem in that, in the interface units to which the present invention is not applied as shown in FIG. 12 or FIGS. 13A and 13B, the overall delay increases when only the read phase bR of the clock crossover unit (b) 211c is reset to the initial value of the read phase shown in (A) in FIG. 17, but other clock crossover units are not reset at the time of recovery after the transmission line section of the downstream line 16 is disconnected, and (D) is a time chart showing the case when the difference between the write phase and the read phase of all clock crossover units is reset to the initial value at the time of recovery after the transmission line section of the downstream line 16 is disconnected in the interface units according to the second embodiment of the present invention as shown in FIGS. 14A, 14B, and 15.

According to the second embodiment of the present invention, as shown in (D) in FIG. 17, the amount of delay from the write phase aW of the clock crossover unit (a) 202d to the read phase dR of the clock crossover unit (d) 207d may be kept constant by resetting the read phase bR of the clock crossover unit (b) 211d just as shown in FIG. 17C, and also resetting the phase difference between the write phase cW and the read phase cR of other clock crossover units (c) 213d and (d) 207d.

Effects of the Invention

As is evident from the above description, according to the present invention, in a system for measuring the distance between a reference position and a terminal by transmitting identical data via a plurality of transmission channels in a transmission line section between a reference position and the terminal and then selecting an optimal transmission channel to receive the data, a phase difference delay control system that allows the distance between the reference position and the terminal to be measured even when the transmission line section is disconnected and then recovers after fluctuation of the phase difference between the write phase and the read phase of clock crossover units can be provided, whereby an increase in delay occurring at the time of recovery of the line can be inhibited, the actual transmission distance can be made longer, and restrictions on system configuration can be mitigated.

What is claimed is:

1. A phase difference delay control system in a distance measuring system, the phase difference control system comprising a first interface unit and a second interface unit that are connected between a reference position and a terminal via a transmission line and measuring the distance between said reference position and the terminal by transmitting a signal between said reference position and said terminal, wherein said first interface unit and said second interface unit comprise respective clock crossover units for sending to said transmission line the signal to which an overhead including phase information for matching the phase of a redundant signal is added, or for sending to said terminal or said reference position the signal from said transmission line from which said overhead is deleted, wherein at least a portion of said clock crossover units operates according to a reference clock signal, said respective clock crossover units including a first and a second clock crossover unit in said first interface unit, and a third and a fourth clock crossover unit in said second interface unit, and one of the second and third clock crossover units that operates according to said reference clock signal is notified of the fluctuation amount of a phase difference between a write clock signal and a read clock signal in one of the first and fourth clock crossover units that operates according to said reference clock signal and, upon initialization of the phase difference between the write clock signal and the read clock signal of said one of the second and third clock crossover units, a predetermined value of the phase difference is adjusted taking said amount of fluctuation into account.

2. A phase difference delay control system according to claim 1, wherein said phase difference delay control system comprises a network synchronization system in which all reading operations are performed according to said reference clock signal, and wherein the second clock crossover unit at a receiving side is notified of the fluctuation amount from an initial value of difference between a write phase and a read phase of the first clock crossover unit at the transmitting side and, upon initialization of the second clock crossover unit at said receiving side, the predetermined phase difference is adjusted taking said amount of fluctuation into account, thereby allowing the signal processing time from said first interface unit to said second interface unit to be kept constant.

3. A phase difference delay control system according to claim 2, wherein said first interface unit comprises:
the first clock signal generator that operates according to said reference clock signal;
a second clock signal generator that operates according to said reference clock signal;
a first clock crossover unit to which data from said reference position is written according to a second clock signal that is output from said second clock signal generator, and from which said data with the addition of said overhead is read to a downlink transmission line according to a first clock signal that is output from said first clock signal generator; and
the second clock crossover unit to which received data from said second interface unit is written according to a second generated clock signal that is regenerated from said received data from said second interface unit, and from which said received data from which the overhead is deleted is read to said reference position according to the second clock signal that is output from said second clock signal generator, and said second interface unit comprises:
a third clock signal generator that operates according to said reference clock signal;
a fourth clock signal generator that operates according to said reference clock signal;
the third clock crossover unit to which received data is written according to a first generated clock signal that is regenerated from said received data from said first interface unit, and from which said received data from which the overhead is deleted is read and sent to said terminal; and
the fourth clock crossover unit to which data from said terminal is written according to said third clock signal, that is output from said third clock generator and from which said received data with the addition of the overhead is read according to a clock signal that is output from said fourth clock signal generator and sent to said first interface unit via an uplink transmission line.

4. A phase difference delay control system according to claim 1, wherein said phase difference delay control system comprises a slave synchronization system in which only the clock crossover units in said first interface unit operate according to said reference clock signal and the clock crossover units in said second interface unit operate according to a clock signal that is regenerated from data received from said first interface unit, wherein the second clock crossover unit at a receiving side in said first interface unit is notified of the fluctuation amount from an initial value of difference between a write phase and a read phase of the first clock crossover unit at a transmitting side in said first interface unit and, upon initialization of the second clock crossover unit at said receiving side, the predetermined value of the phase difference is adjusted taking said amount of fluctuation into account, thereby allowing round-trip signal processing time between said first interface unit and said second interface unit to be kept constant.

5. A phase difference delay control system according to claim 4, wherein said first interface unit comprises:
  a first clock signal generator that operates according to said reference clock signal;
  a second clock signal generator that operates according to said reference clock signal;
  the first clock crossover unit to which data from said reference position is written according to a second clock signal that is output from said second clock signal generator, and from which said data with the addition of said overhead is read to a downlink transmission line according to a first clock signal that is output from said first clock signal generator; and
  the second clock crossover unit to which data from said second interface unit is written according to a second regenerated clock signal that is regenerated from said received data from said second interface unit, and from which said received data from which the overhead is deleted is read to said reference position according to the second clock signal that is output from said second clock signal generator, and said second interface unit comprises:
  third and fourth clock signal generators that operate according to a first regenerated clock signal that is regenerated from received data from said first interface unit via a downlink transmission line;
  the third clock crossover unit to which received data is written according to the first regenerated clock signal that is regenerated from said received data from said first interface unit, and from which said received data from which the overhead is deleted is read from said first interface unit and sent to said terminal according to a third clock signal that is output from said third clock signal generator; and
  the fourth clock crossover unit to which data from said terminal is written according to the third clock signal that is output from said third clock signal generator, and from which said written data with the addition of the overhead is read and sent to said first interface unit via an uplink transmission line according to a fourth clock signal that is output from said fourth clock signal generator.

* * * * *